US012709560B2

(12) United States Patent
Tarpeh et al.

(10) Patent No.: US 12,709,560 B2
(45) Date of Patent: Aug. 18, 2026

(54) SYSTEMS AND METHODS OF FLEXIBLE ELECTROCHEMICAL STRIPPING TO RECOVER ALKALINE AMMONIA AND ACIDIC AMMONIUM FROM WASTEWATERS

(71) Applicant: The Board of Trustees of the Leland Stanford Junior University, Stanford, CA (US)

(72) Inventors: William A. Tarpeh, Union City, CA (US); Anna Kogler, Stanford, CA (US); Brandon D. Clark, Attleboro, MA (US); Matthew Junjie Liu, Palo Alto, CA (US); William Chow, Sherman Oaks, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 752 days.

(21) Appl. No.: 18/041,678

(22) PCT Filed: Aug. 16, 2021

(86) PCT No.: PCT/US2021/046167
§ 371 (c)(1),
(2) Date: Feb. 14, 2023

(87) PCT Pub. No.: WO2022/036326
PCT Pub. Date: Feb. 17, 2022

(65) Prior Publication Data

US 2024/0025776 A1 Jan. 25, 2024

Related U.S. Application Data

(60) Provisional application No. 63/065,988, filed on Aug. 14, 2020.

(51) Int. Cl.
*C02F 1/469* (2023.01)
*C02F 1/20* (2023.01)
(Continued)

(52) U.S. Cl.
CPC .............. *C02F 1/4693* (2013.01); *C02F 1/20* (2013.01); *C02F 1/46109* (2013.01);
(Continued)

(58) Field of Classification Search
CPC .... C02F 1/4693; C02F 1/461; C02F 1/46104; C02F 2201/46115; C02F 2101/16
See application file for complete search history.

(56) References Cited

U.S. PATENT DOCUMENTS 4,911,804 A 3/1990 Dickson
5,904,823 A 5/1999 Sharifian et al.
(Continued)

FOREIGN PATENT DOCUMENTS

CN 112520818 A 3/2021
DE 19815669 A1 10/1999
(Continued)

OTHER PUBLICATIONS

International Preliminary Report on Patentability received for International Application No. PCT/US2021/046015, Report issued Feb. 16, 2023, Mailed on Mar. 2, 2023, 6 pgs.
(Continued)

*Primary Examiner* — Ciel P Contreras
(74) *Attorney, Agent, or Firm* — KPPB LLP

(57) ABSTRACT

Most nitrogen recovery techniques recover acidic ammonium fertilizers, and few enable alkaline ammonia recovery. Many embodiments provide multi-chamber electrochemical stripping reactors to recover alkaline ammonia and acidic ammonium from wastewater. The reactor combines electrodialysis and membrane stripping. The acidic and alkaline
(Continued)

product portfolio for wastewater-derived ammonia expand implementation opportunities for nitrogen recovery.

20 Claims, 17 Drawing Sheets

(51) Int. Cl.
*C02F 1/461* (2023.01)
*C02F 101/16* (2006.01)
*C02F 103/00* (2006.01)

(52) U.S. Cl.
CPC ......................... *C02F 2001/46142* (2013.01); *C02F 2101/16* (2013.01); *C02F 2103/005* (2013.01); *C02F 2201/46115* (2013.01)

(56) References Cited

U.S. PATENT DOCUMENTS

| | | | | |
|---|---|---|---|---|
| 8,152,988 | B2 | 4/2012 | Aulich et al. | |
| 9,551,076 | B2 | 1/2017 | Buschmann | |
| 10,125,428 | B2 | 11/2018 | Barak | |
| 2008/0292912 | A1* | 11/2008 | Logan | H01M 8/16 429/2 |
| 2009/0057161 | A1 | 3/2009 | Aulich et al. | |
| 2010/0051542 | A1 | 3/2010 | Elektorowicz et al. | |
| 2011/0281139 | A1 | 11/2011 | Huang et al. | |
| 2013/0168262 | A1 | 7/2013 | Reyter et al. | |
| 2013/0228457 | A1 | 9/2013 | Bilbao et al. | |
| 2020/0198995 | A1 | 6/2020 | Ganzi et al. | |
| 2021/0276891 | A1 | 9/2021 | Li et al. | |
| 2023/0365442 | A1 | 11/2023 | Zhang et al. | |
| 2023/0365444 | A1 | 11/2023 | Tarpeh et al. | |

FOREIGN PATENT DOCUMENTS

| | | | |
|---|---|---|---|
| EP | 2802684 | B1 | 10/2018 |
| WO | 2020028570 | A1 | 2/2020 |
| WO | 2022036326 | A1 | 2/2022 |
| WO | 2022040051 | A1 | 2/2022 |
| WO | 2025038754 | A1 | 2/2025 |

OTHER PUBLICATIONS

International Preliminary Report on Patentability received for International Application No. PCT/US2021/046167, Report issued Feb. 7, 2023, Mailed on Feb. 23, 2023, 8 pgs.
International Search Report and Written Opinion received for International Application No. PCT/US2021/046015, Search completed Oct. 11, 2021, Mailed on Nov. 22, 2021, 12 pgs.
International Search Report and Written Opinion received for International Application No. PCT/US2021/046167, Search completed Oct. 22, 2021, Mailed on Jan. 5, 2022, 17 pgs.
International Search Report and Written Opinion received for International Application No. PCT/US2024/042321, Search completed Nov. 19, 2024, Mailed on Dec. 5, 2024, 15 pgs.
"Biological Nutrient Removal Processes and Cost", United States Environmental Protection Agency, Jun. 2007, 15 pgs.
"Nutrient Control Design Manual: State of Technology Review Report", United States Environmental Protection Agency, Jan. 2009, 104 pgs.
Basakcilardan-Kabakci et al., "Recovery of Ammonia from Human Urine by Stripping and Absorption", Environmental Engineering Science, vol. 24, No. 5, May 22, 2007, pp. 615-624, doi: 10.1089/ees.2006.0412.
Baum et al., "Sanitation: A Global Estimate of Sewerage Connections without Treatment and the Resulting Impact on MDG Progress", Environmental Science & Technology, vol. 47, No. 4, Jan. 16, 2013, pp. 1994-2000, doi: 10.1021/es304284f.
Baykal et al., "The effect of initial loading on the removal of ammonium and potassium from source-separated human urine via clinoptilolite", Water Science & Technology, vol. 60, No. 10, Nov. 2009, pp. 2515-2520, doi: 10.2166/wst.2009.614.
Beler-Baykal et al., "Ion exchange with clinoptilolite to control ammonium in drinking water", Journal of Water Supply: Research and Technology-AQUA, vol. 56, No. 8, Dec. 2007, pp. 541-547, doi: 10.2166/aqua.2007.070.
Chen, "Electrochemical technologies in wastewater treatment", Separation and Purification Technology, vol. 38, No. 1, Jul. 15, 2004, pp. 11-41, doi: 10.1016/j.seppur.2003.10.006.
Chrispim et al., "The sanitation and urban agriculture nexus: urine collection and application as fertilizer in São Paulo, Brazil", Journal of Water, Sanitation and Hygiene for Development, vol. 7, No. 3, Sep. 2017, pp. 455-465, doi: 10.2166/washdev.2017.163.
Cid et al., "Phosphate Recovery from Human Waste via the Formation of Hydroxyapatite during Electrochemical Wastewater Treatment", ACS Sustainable Chemistry & Engineering, vol. 6, No. 3, Feb. 5, 2018, pp. 3135-3142, doi: 10.1021/acssuschemeng.7b03155.
Comisso et al., "Electrodeposition of Cu—Rh alloys and their use as cathodes for nitrate reduction", Electrochemistry Communications, vol. 25, Nov. 2012, pp. 91-93, doi: 10.1016/j.elecom.2012.09.026.
Da Cunha et al., "Reaction Pathways for Reduction of Nitrate Ions on Platinum, Rhodium, and Platinum-Rhodium Alloy Electrodes", Langmuir, vol. 16, No. 2, Nov. 12, 1999, pp. 771-777, doi: 10.1021/la990638s.
Daigger, "Oxygen and Carbon Requirements for Biological Nitrogen Removal Processes Accomplishing Nitrification, Nitritation, and Anammox", Water Environment Research, vol. 86, No. 3, Mar. 2014, pp. 204-209, doi: 10.2175/106143013X13807328849459.
Decrey et al., "Ammonia as an In Situ Sanitizer: Inactivation Kinetics and Mechanisms of the ssRNA Virus MS2 by NH3", Environmental Science & Technology, vol. 49, No. 2, Dec. 12, 2014, pp. 1060-1067, doi: 10.1021/es5044529.
Desloover et al., "Electrochemical Nutrient Recovery Enables Ammonia Toxicity Control and Biogas Desulfurization in Anaerobic Digestion", Environmental Science & Technology, vol. 49, No. 2, Dec. 17, 2014, pp. 948-955, doi: 10.1021/es504811a.
Desloover et al., "Electrochemical Resource Recovery from Digestate to Prevent Ammonia Toxicity during Anaerobic Digestion", Environmental Science & Technology, vol. 46, No. 21, Oct. 10, 2012, pp. 12209-12216, doi: 10.1021/es3028154.
Dodds et al., "Eutrophication of U.S. Freshwaters: Analysis of Potential Economic Damages", Environmental Science & Technology, vol. 43, No. 1, Nov. 12, 2008, pp. 12-19, doi: 10.1021/es801217q.
Dykstra et al., "Theory of ion transport with fast acid-base equilibrations in bioelectrochemical systems", Physical Review E, vol. 90, Article 013302, Jul. 2, 2014, 10 pgs., doi: 10.1103/PhysRevE.90.013302.
Etter et al., "Low-cost struvite production using source-separated urine in Nepal", Water Research, vol. 45, No. 2, Jan. 2011, pp. 852-862, doi: 10.1016/j.watres.2010.10.007.
Feng et al., "Electrochemical Technologies for Wastewater Treatment and Resource Reclamation", Environmental Science: Water Research & Technology, vol. 2, No. 5, 2016, pp. 800-831, doi: 10.1039/C5EW00289C.
Fields, "Global Nitrogen: Cycling out of Control", Environmental Health Perspectives, vol. 112, No. 10, Jul. 2004, pp. A556-A563, doi: 10.1289/ehp.112-a556.
Friedler et al., "Wastewater composition", Chapter 17, Source Separation and Decentralization for Wastewater Management, IWA Publishing, Jan. 2013, pp. 241-257, doi: 10.2166/9781780401072.
Fumasoli et al., "Operating a pilot-scale nitrification/distillation plant for complete nutrient recovery from urine", Water Science & Technology, vol. 73, No. 1, Jan. 8, 2016, pp. 215-222, doi: 10.2166/wst.2015.485.
Galloway et al., "Transformation of the Nitrogen Cycle: Recent Trends, Questions, and Potential Solutions", Science, vol. 320, No. 5878, May 16, 2008, pp. 889-892, doi: 10.1126/science. 1136674.
Gao et al., "Enhanced reduction of nitrate by noble metal-free electrocatalysis on P doped three-dimensional Co3O4 cathode: Mechanism exploration from both experimental and DFT studies",

(56) References Cited

OTHER PUBLICATIONS

Chemical Engineering Journal, vol. 382, Article 123034, Feb. 15, 2020, 41 pgs., doi: 10.1016/j.cej.2019.123034.
Gao et al., "Towards energy neutral wastewater treatment: methodology and state of the art", Environment Science: Processes & Impacts, vol. 16, No. 6, 2014, pp. 1223-1246, doi: 10.1039/c4em00069b.
Garcia-Segura et al., "Electrocatalytic reduction of nitrate: Fundamentals to full-scale water treatment applications", Applied Catalysis B: Environmental, vol. 236, Nov. 15, 2018, pp. 546-568, doi: 10.1016/j.apcatb.2018.05.041.
Guest et al., "A New Planning and Design Paradigm to Achieve Sustainable Resource Recovery from Wastewater", Environmental Science & Technology, vol. 43, No. 16, Jul. 14, 2009, pp. 6126-6130, doi: 10.1021/es9010515.
He et al., "Advances in microbial fuel cells for wastewater treatment", Renewable and Sustainable Energy Reviews, vol. 71, May 2017, pp. 388-403, doi: 10.1016/j.rser.2016.12.069.
Huang et al., "Simultaneous removal of nutrients from simulated swine wastewater by adsorption of modified zeolite combined with struvite crystallization", Chemical Engineering Journal, vol. 256, Nov. 15, 2014, pp. 431-438, doi: 10.1016/j.cej.2014.07.023.
Hug et al., "Struvite precipitation from urine with electrochemical magnesium dosage", Water Research, vol. 47, No. 1, Jan. 1, 2013, pp. 289-299, doi: 10.1016/j.watres.2012.09.036.
Ieropoulos et al., "Urine Utilisation by Microbial Fuel Cells; energy fuel for the future.", Physical Chemistry Chemical Physics, vol. 14, 2012, pp. 94-98, doi: 10.1039/c1cp23213d.
Ippersiel et al., "Nitrogen potential recovery and concentration of ammonia from swine manure using electrodialysis coupled with air stripping", Journal of Environmental Management, vol. 95, Supplement, Mar. 2012, pp. S165-S169, doi: 10.1016/j.jenvman.2011.05.026.
Ishii et al., "Life cycle comparison of centralized wastewater treatment and urine source separation with struvite precipitation: Focus on urine nutrient management", Water Research, vol. 79, Aug. 1, 2015, pp. 88-103, doi: 10.1016/j.watres.2015.04.010.
Iskander et al., "Resource recovery from landfill leachate using bioelectrochemical systems: Opportunities, challenges, and perspectives", Bioresource Technology, vol. 201, Feb. 2016, pp. 347-354, doi: 10.1016/j.biortech.2015.11.051.
Jenkins et al., "Inactivation of Cryptosporidium parvum Oocysts by Ammonia", Applied and Environmental Microbiology, vol. 64, No. 2, Feb. 1, 1998, pp. 784-788, doi: 10.1128/aem.64.2.784-788.1998.
Jermakka et al., "Potential Technologies for the Removal and Recovery of Nitrogen Compounds From Mine and Quarry Waters in Subarctic Conditions", Critical Reviews in Environmental Science and Technology, vol. 45, No. 7, 2015, pp. 703-748, doi: 10.1080/10643389.2014.900238.
Kavvada et al., "Life-cycle cost and environmental assessment of decentralized nitrogen recovery using ion exchange from source-separated urine through spatial modeling", Environmental Science & Technology, vol. 51, No. 21, Sep. 26, 2017, pp. 12061-12071, doi: 10.1021/acs.est.7b02244.
Kemp et al., "Eutrophication of Chesapeake Bay: historical trends and ecological interactions", Marine Ecology Progress Series, vol. 303, Nov. 21, 2005, pp. 1-29., doi: 10.3354/meps303001.
Kuntke et al., "Ammonium recovery and energy production from urine by a microbial fuel cell", Water Research, vol. 46, No. 8, May 15, 2012, pp. 2627-2636, doi: 10.1016/j.watres.2012.02.025.
Lackner et al., "Full-scale partial nitritation/anammox experiences—An application survey", Water Research, vol. 55, May 15, 2014, pp. 292-303, doi: 10.1016/j.watres.2014.02.032.
Lahav et al., "Sustainable removal of ammonia from anaerobic-lagoon swine waste effluents using an electrochemically-regenerated ion exchange process", Chemical Engineering Journal, vol. 218, Feb. 15, 2013, pp. 214-222, doi: 10.1016/j.cej.2012.12.043.
Larsen et al., "Emerging solutions to the water challenges of an urbanizing world", Science, vol. 352, No. 6288, May 20, 2016, pp. 928-933, doi: 10.1126/science.aad8641.
Larsen et al., "Separate Management of Anthropogenic Nutrient Solutions (Human Urine)", Water Science and Technology, vol. 34, No. 3-4, 1996, pp. 87-94, doi: 1016/0273-1223(96)00560-4.
Larsen et al., "Source Separation: Will We See a Paradigm Shift in Wastewater Handling?", Environmental Science & Technology, vol. 43, No. 16, Jul. 14, 2009, pp. 6121-6125, doi: 10.1021/es803001r.
Ledezma et al., "Source-separated urine opens golden opportunities for microbial electrochemical technologies", Trends in Biotechnology, vol. 33, No. 4, Apr. 2015, pp. 214-220, doi: 10.1016/j.tibtech.2015.01.007.
Li et al., "Quantitative Evaluation of an Integrated System for Valorization of Wastewater Algae as Bio-oil, Fuel Gas, and Fertilizer Products", Environmental Science & Technology, vol. 52, No. 21, Sep. 26, 2018, pp. 12717-12727, doi: 10.1021/acs.est.8b04035.
Li et al., "Recovery of ammonium-nitrogen from landfill leachate as a multi-nutrient fertilizer", Ecological Engineering, vol. 20, No. 2, May 2003, pp. 171-181, doi: 10.1016/S0925-8574(03)00012-0.
Liao et al., "Removal of Nitrogen From Swine Manure Wastewaters by Ammonia Stripping", Bioresource Technology, vol. 54, No. 1, 1995, pp. 17-20, doi: 10.1016/0960-8524(95)00105-0.
Liu et al., "Activity and Selectivity Trends in Electrocatalytic Nitrate Reduction on Transition Metals", ACS Catalysis, vol. 9, No. 8, Jun. 25, 2019, pp. 7052-7064, doi: 10.1021/acscatal.9b02179.
Liu et al., "Building an operational framework for selective nitrogen recovery via electrochemical stripping", Water Research, vol. 169, Article 115226, Feb. 1, 2020, 36 pgs., doi: 10.1016/j.watres.2019.115226.
Liu et al., "Reactive Separation of Ammonia from Wastewater Nitrate via Molecular Electrocatalysis", Environmental Science & Technology Letters, vol. 10, No. 5, Apr. 27, 2023, pp. 458-463, doi: 10.1021/acs.estlett.3c0020.
Luther et al., "Electrochemically driven extraction and recovery of ammonia from human urine", Water Research, vol. 87, Dec. 15, 2015, pp. 367-377, doi: 10.1016/j.watres.2015.09.041.
Macova et al., "Electrocatalytic activity of copper alloys for NO3-reduction in a weakly alkaline solution: Part 2: Copper-tin", Journal of Applied Electrochemistry, vol. 37, Jan. 13, 2007, pp. 557-566, doi: 10.1007/s10800-006-9287-8.
Maurer et al., "Nutrients in urine: energetic aspects of removal and recovery", Water Science and Technology, vol. 48, No. 1, 2003, pp. 37-46, doi: 10.2166/wst.2003.0011.
Mccarty et al., "Domestic Wastewater Treatment as a Net Energy Producer—Can This Be Achieved?", Environmental Science & Technology, vol. 45, Jul. 12, 2011, pp. 7100-7106, doi: 10.1021/es2014264.
Moran, "New Nutrients Requirements on Wastewater to San Francisco Bay", California Environmental Protection Agency Media Release, San Francisco, CA Feb. 7, 2014, 1 pg.
Muckle et al., "Characterization of Spacecraft Humidity Condensate", SAE Transactions, vol. 102, 1993, pp. 1115-1129, doi: 10.4271/932176.
Nelson et al., "Sanitation for Unserved Populations: Technologies, Implementation Challenges, and Opportunities", Annual Review of Environment and Resources, vol. 33, 2008, pp. 119-151, doi: 10.1146/annurev.environ.33.022007.145142.
Nixon, "Coastal marine eutrophication: A definition, social causes, and future concerns", Ophelia, vol. 41, No. 1, Feb. 1995, pp. 199-219, doi: 10.1080/00785236.1995.10422044.
Norskov, "Sustainable Ammonia Synthesis", Stanford | Engineering, National Accelerator Laboratory, Department of Energy, 2016, 25 pgs.
Nyenje et al., "Eutrophication and nutrient release in urban areas of sub-Saharan Africa—A review", Science of the Total Environment, vol. 408, No. 3, Jan. 1, 2010, pp. 447-455, doi: 10.1016/j.scitotenv.2009.10.020.
Ogunyoku et al., "In-toilet disinfection of fresh fecal sludge with ammonia naturally present in excreta", Journal of Water, Sanitation and Hygiene for Development, vol. 6, No. 1, Mar. 1, 2016, pp. 104-114, doi: 10.2166/washdev.2015.233.

(56) References Cited

OTHER PUBLICATIONS

Pecson et al., "Inactivation of Ascaris suum Eggs by Ammonia", Environmental Science & Technology, vol. 39, No. 20, Sep. 9, 2005, pp. 7909-7914, doi: 10.1021/es050659a.
Perez-Coronado et al., "Control of selectivity in the reduction of nitrate by shielding of Pd—Cu/C catalysts with AOT", Journal of Industrial and Engineering Chemistry, vol. 82, Feb. 25, 2020, pp. 42-49, doi: 10.1016/j.jiec.2019.09.039.
Polatides et al., "Electrochemical reduction of nitrate ion on various cathodes—reaction kinetics on bronze cathode", Journal of Applied Electrochemistry, vol. 35, May 2005, pp. 421-427, doi: 10.1007/s10800-004-8349-z.
Pronk et al., "Treatment of source-separated urine by a combination of bipolar electrodialysis and a gas transfer membrane", Water Science & Technology, vol. 53, No. 3, Feb. 1, 2006, pp. 139-146, doi: 10.2166/wst.2006.086.
Qin et al., "Recovery of Nitrogen and Water from Landfill Leachate by a Microbial Electrolysis Cell—Forward Osmosis System", Bioresource Technology, vol. 200, Jan. 2016, pp. 485-492, doi: 10.1016/j.biortech.2015.10.066.
Rosca et al., "Nitrogen Cycle Electrocatalysis", Chemical Reviews, vol. 109, No. 6, May 13, 2009, pp. 2209-2244, doi: 10.1021/cr8003696.
Schoen et al., "Cost, energy, global warming, eutrophication and local human health impacts of community water and sanitation service options", Water Research, vol. 109, Feb. 1, 2017, pp. 186-195, doi: 10.1016/j.watres.2016.11.044.
Shih et al., "Electrochemical nitrate reduction as affected by the crystal morphology and facet of copper nanoparticles supported on nickel foam electrodes (Cu/Ni)", Chemical Engineering Journal, vol. 383, Article 123157, Mar. 1, 2020, 11 pgs., doi: 10.1016/j.cej.2019.123157.
Sid et al., "Cost minimization in a full-scale conventional wastewater treatment plant: associated costs of biological energy consumption versus sludge production", Water Science & Technology, vol. 76, No. 9, Nov. 16, 2017, pp. 2473-2481, doi: 10.2166/wst.2017.423.
Siegrist, "Nitrogen Removal From Digester Supernatant—Comparison of Chemical and Biological Methods", Water Science and Technology, vol. 34, No. 1-2, 1996, pp. 399-406, doi: 10.1016/0273-1223(96)00529-X.
Singh et al., "Electrochemical Ammonia Synthesis—The Selectivity Challenge", ACS Catalysis, vol. 7, No. 1, Dec. 7, 2016, pp. 706-709. doi: 10.1021/acscatal.6b03035.
Singh et al., "Role of Electrocatalysis in the Remediation of Water Pollutants", ACS Catalysis, vol. 10, No. 5, Feb. 11, 2020, pp. 3365-3371, doi: 10.1021/acscatal.9b04167.
Tarpeh et al., "Comparing ion exchange adsorbents for nitrogen recovery from source-separated urine", Environmental Science and Technology, vol. 51, No. 4, Jan. 18, 2017, pp. 2373-2381, doi: 10.1021/acs.est.6b05816.
Tarpeh et al., "Effects of operating and design parameters on ion exchange columns for nutrient recovery from urine", Environmental Science: Water Research & Technology, vol. 8, No. 6, 2018, pp. 828-838, doi: 10.1039/C7EW00478H.
Tarpeh et al., "Electrochemical stripping to recover nitrogen from source-separated urine", Environmental Science & Technology, vol. 52, No. 3, Jan. 5, 2018, pp. 1453-1460, doi: 10.1021/acs.est.7b05488.
Tarpeh et al., "Evaluating ion exchange for nitrogen recovery from source-separated urine in Nairobi, Kenya", Development Engineering, vol. 3, 2018, pp. 188-195, doi: 10.1016/j.deveng.2018.07.002.
Tokazhanov et al., "Advances in the catalytic reduction of nitrate by metallic catalysts for high efficiency and N2 selectivity: A review", Chemical Engineering Journal, vol. 384, Article 123252, Mar. 15, 2020, 49 pgs., doi: 1016/j.cej.2019.123252.
Udert et al., "Complete nutrient recovery from source-separated urine by nitrification and distillation", Water Research, vol. 46, No. 2, Feb. 1, 2012, pp. 453-464, doi: 10.1016/j.watres.2011.11.020.
Udert et al., "Fate of major compounds in source-separated urine", Water Science & Technology, vol. 54, No. 11-12, Dec. 1, 2006, pp. 413-420, doi: 10.2166/wst.2006.921.
Wang et al., "Nitrogen recovery from low-strength wastewater by combined membrane capacitive deionization (MCDI) and ion exchange (IE) process", Chemical Engineering Journal, vol. 316, May 15, 2017, pp. 1-6, doi: 10.1016/j.cej.2017.01.082.
Weatherley et al., "Comparison of the ion exchange uptake of ammonium ion onto New Zealand clinoptilolite and mordenite", Water Research, vol. 38, No. 20, Dec. 2004, pp. 4305-4312, doi: 10.1016/j.watres.2004.08.026.
Zhang et al., "Ammonia-Rich Solution Production from Wastewaters Using Chemical-Free Flow-Electrode Capacitive Deionization", ACS Sustainable Chemistry & Engineering, vol. 7, No. 7, Mar. 7, 2019, pp. 6480-6485, doi: 10.1021/acssuschemeng.9b00314.
Zhang et al., "Capacitive Membrane Stripping for Ammonia Recovery (CapAmm) from Dilute Wastewaters", Environmental Science & Technology Letters, vol. 5, No. 1, Dec. 21, 2017, pp. 43-49, doi: 10.1021/acs.estlett.7b00534.
Zhang et al., "Continuous Ammonia Recovery from Wastewaters Using an Integrated Capacitive Flow Electrode Membrane Stripping System", Environmental Science & Technology, vol. 52, No. 24, Nov. 21, 2018, pp. 14275-14285, doi: 10.1021/acs.est.8b02743.
Zhao et al., "TiO2-based catalysts for photocatalytic reduction of aqueous oxyanions: State-of-the-art and future prospects", Environment International, vol. 136, Article 105453, Mar. 2020, 17 pgs., doi: 10.1016/j.envint.2019.105453.

* cited by examiner

SYSTEMS AND METHODS OF FLEXIBLE ELECTROCHEMICAL STRIPPING TO RECOVER ALKALINE AMMONIA AND ACIDIC AMMONIUM FROM WASTEWATERS

CROSS-REFERENCE TO RELATED APPLICATIONS

The current application is a national stage of PCT Patent Application No. PCT/US2021/046167 entitled "Systems and Methods of Flexible Electrochemical Stripping to Recover Alkaline Ammonia and Acidic Ammonium from Wastewaters" filed Aug. 16, 2021, which claims the benefit of and priority to U.S. Provisional Patent Application No. 63/065,988 entitled "Flexible Electrochemical Stripping to Recover Alkaline and Acidic Ammonia from Wastewaters" filed Aug. 14, 2020. The disclosure of PCT Patent Application No. PCT/US2021/046167 and U.S. Provisional Patent Application No. 63/065,988 are hereby incorporated by reference in their entireties for all purposes.

FIELD OF THE INVENTION

The present invention generally relates to apparatuses and systems for recovering alkaline and acidic ammonia from wastewaters; and more particularly to electrochemical membranes and electrochemical stripping reactors to recover alkaline ammonia and acidic ammonium from wastewaters.

BACKGROUND OF THE INVENTION

Nitrogen in wastewater can harm human health and the environment. To prevent such negative impacts, most approaches focus on removing nitrogen prior to discharging wastewater to the environment and have high energy inputs. The energy-intensive Haber-Bosch process reverses nitrogen removal processes to generate ammonia, a critical commodity chemical. Recovering nitrogen from wastewater for beneficial reuse in a circular economy can reduce energy consumption, chemical use, greenhouse gas emissions, and costs of wastewater treatment and chemical manufacturing.

BRIEF SUMMARY OF THE INVENTION

Methods and systems for developing electrochemical stripping reactors to recover alkaline ammonia and acidic ammonium from wastewaters are illustrated. Many embodiments implement a multi-chamber electrochemical stripping reactor that allows generation of acidic ammonium and alkaline ammonia in different ratios in the same reactor. Several embodiments implement a four-chamber electrochemical stripping reactor for acidic ammonium and alkaline ammonia recovery. In several embodiments, the reactors can combine electrodialysis and membrane stripping. Several embodiments provide electrochemical cell operation on ammonium sulfate and ammonium hydroxide recovery. Many embodiments recover acidic ammonium and alkaline ammonia from fecal sludge treatment plant (FSTP) effluent. Some embodiments provide feasibility of recovering ammonium sulfate and ammonium hydroxide from FSTP effluent. A number of embodiments provide ammonium sulfate fertilizer and ammonium hydroxide disinfectant recovery using a four-chamber electrochemical reactor. Several embodiments can recover nitrogen from various ammonia-rich wastewaters, including (but not limited to) urine, anaerobic digester effluent, municipal wastewater, and reverse osmosis concentrate.

Most nitrogen recovery techniques recover acidic ammonium fertilizers, and few enable alkaline ammonia recovery. Many embodiments expand the product portfolio for wastewater-derived ammonia to include both acidic ammonium and alkaline ammonia. Several embodiments can facilitate a circular nitrogen economy with lower environmental impacts and costs.

One embodiment of the invention includes an electrochemical stripping reactor for removing ammonia and ammonium and recovering acidic ammonium and alkaline ammonia comprising at least two anode chambers and each chamber comprising at least one anode, at least two cathode chambers and each chamber comprising at least one cathode, at least one cation exchange membrane, and at least one gas permeable membrane; where the anode chambers and the cathode chambers are disposed in alternating arrangement, and the cation exchange membrane and the gas permeable membrane are disposed in alternating arrangement, the cation exchange membrane is disposed between a first anode chamber and a first cathode chamber sequentially, and the gas permeable membrane is disposed between the first cathode chamber and a second anode chamber sequentially; where at least the second anode chamber recovers acidic ammonium; and where at least a second cathode chamber recovers alkaline ammonia.

In a further embodiment, the anode chambers have a lower pH value than the cathode chambers.

In an additional embodiment, the anode chambers have a pH value lower than 7 and the cathode chambers have a pH value higher than 7.

In another embodiment, an ammonia-containing aqueous stream influent is added to the first anode chamber or the first cathode chamber.

In a still further embodiment, the ammonia-containing aqueous stream influent is urine, municipal wastewater effluent, or fecal sludge treatment plant effluent.

In still another embodiment, the reactor operates in a concurrent mode or a staggered mode.

In a yet further embodiment, an ammonium removal efficiency is up to about 100%.

In another embodiment again, a total ammonium recovery efficiency is at least 90%.

In a further additional embodiment, a distribution of a total ammonium recovery has controlled alkaline ammonia and acidic ammonium production.

In yet another embodiment, a total alkaline ammonium recovery efficiency is at least 65%.

In a yet further embodiment again, a total acidic ammonium recovery efficiency is at least 25%.

In another additional embodiment, the acidic ammonium is an ammonium salt.

In yet another embodiment again, the ammonium salt is ammonium sulfate.

In a further yet embodiment, the alkaline ammonia is ammonium hydroxide or aqueous ammonia.

In still yet another embodiment, the anode comprises a conductive material that catalyzes oxygen evolution.

In a still further embodiment again, the anode comprises a titanium mesh coated with iridium-tantalum mixed metal oxide.

In still another embodiment again, the cathode comprises a conductive material that catalyzes hydrogen evolution.

In a still further additional embodiment, the cathode comprises a stainless steel mesh.

In a further embodiment, the cation exchange membrane comprises gel polystyrene cross linked with divinylbenzene and modified with sulphonic acid functional group.

In yet another embodiment again, the gas permeable membrane comprises a hydrophobic material allowing passage of gaseous species and resistant to wetting by water.

In a further additional embodiment, the gas permeable membrane comprises PTFE or polyethylene.

Still another additional embodiment includes a method for recovering acidic ammonium and alkaline ammonia comprising:

- feeding an ammonia-containing aqueous stream influent into a first anode chamber, wherein a first anode protonates ammonia from the nitrogen-rich influent;
- passing the protonated ammonium through a first cation exchange membrane into a first cathode chamber, wherein at least a first cathode neutralizes the protonated ammonia;
- passing the deprotonated ammonia through a first gas permeable membrane into a second anode chamber, wherein the pH is acidic and ammonia is recovered as acidic ammonium; and
- passing the ammonium through a second cation exchange membrane into a second cathode chamber, wherein the pH is alkaline and the ammonia is recovered as alkaline ammonia.

In an additional embodiment, the second anode chamber comprises an acidic solution as received from a previous chamber or an acidic solution electrochemically produced.

In yet another embodiment, the acid solution comprises sulfuric acid and the recovered acidic ammonium comprises ammonium sulfate.

In another further embodiment again, the first and second cathode chambers comprises a salt solution.

In a yet further embodiment, the salt solution comprises sodium chloride.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
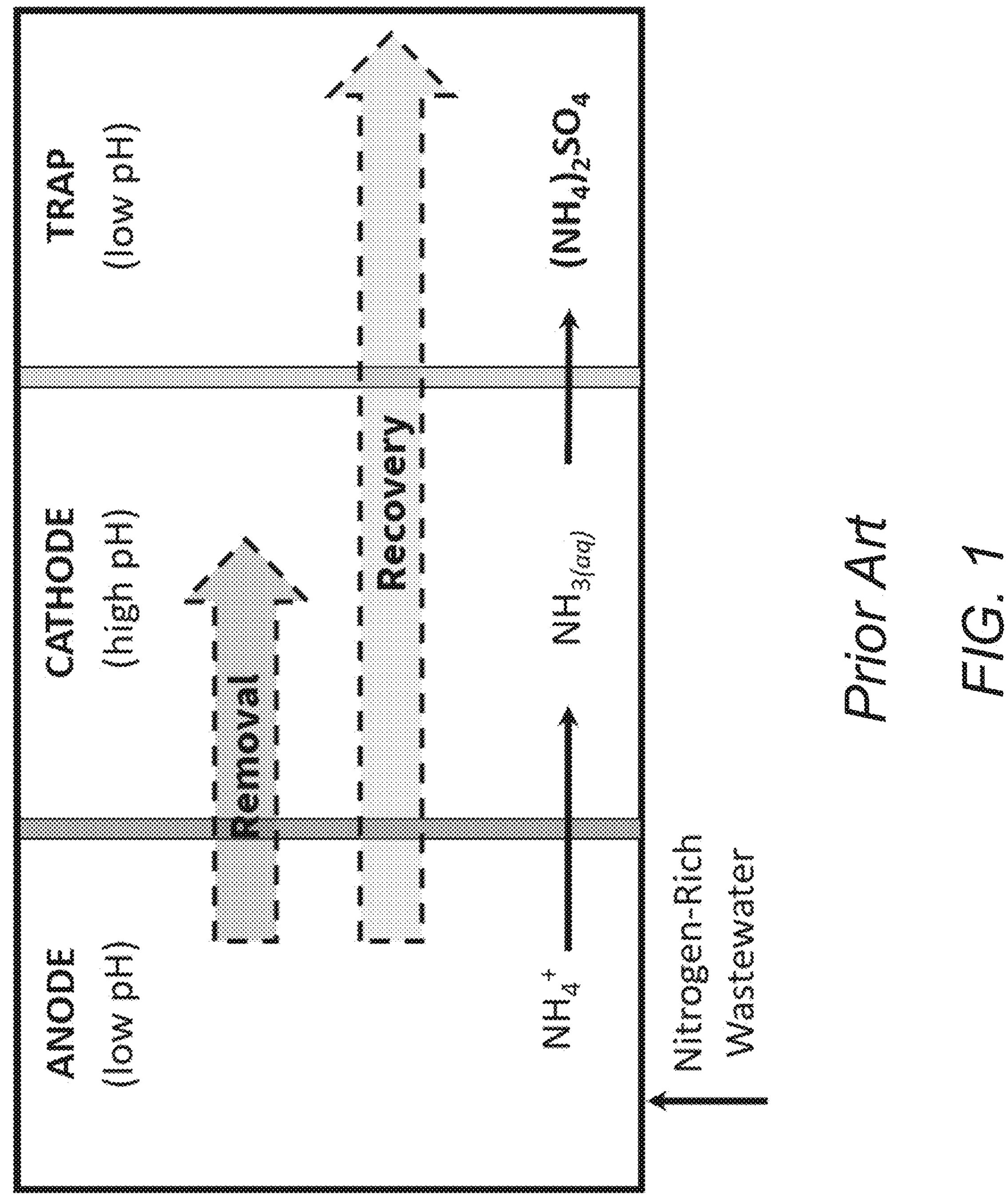
FIG. 1 illustrates process configurations for a three-chamber reactor in accordance with the prior art.

Turning now to the drawings, apparatuses and systems utilizing electrochemical stripping to recover acidic ammonium and alkaline ammonia from wastewaters, are described. Many embodiments provide multi-chamber electrochemical stripping reactors for flexible acidic ammonium and alkaline ammonia recovery. Several embodiments provide four-chamber electrochemical stripping reactors for acidic ammonium and alkaline ammonia recovery. In some embodiments, acidic ammonium includes (but is not limited to): ammonium sulfate. In several embodiments, alkaline ammonia includes (but is not limited to): ammonium hydroxide. Some embodiments provide ammonia and/or ammonium removal and recovery from ammonium salt solution. Examples of ammonium salt solution include (but are not limited to): ammonium phosphate solution. Several embodiments provide ammonia and/or ammonium removal and recovery from real wastewaters, including (but not limited to) fecal sludge treatment plant (FSTP) effluent. Some embodiments provide ammonia and/or ammonium removal and recovery from urine. Some embodiments operate electrochemical stripping reactors in concurrent mode. Some embodiments operate electrochemical stripping reactors in staggered mode. In several embodiments, ammonium sulfate can be used as fertilizer. In certain embodiments, ammonium hydroxide can be used as disinfectant. In a number of embodiments, ammonium removal efficiency can be up to about 100%. In many embodiments, ammonium recovery efficiency can be up to about 90%. In a number of embodiments, ammonium recovery efficiency can be higher than 90%. In many embodiments, the distribution of a total ammonium recovery has controlled alkaline ammonia and acidic ammonium production. In some embodiments, the distribution of ammonium recovery has more alkaline ammonia than acidic ammonium. In a number of embodiments, the distribution of ammonium recovery can be up to and above about 65% ammonium hydroxide, and up to and above about 25% ammonium sulfate.

Many embodiments implement electrodialysis and membrane stripping in electrochemical stripping reactors. Some embodiments include at least four chambers in the electrochemical stripping reactors. At least one chamber may include an anode and at least one chamber may include a cathode in accordance with several embodiments. In several embodiments, anode materials can be a conductive material that catalyzes oxygen evolution. Examples of anode materials include (but are not limited to): titanium mesh coated with Iridium-Tantalum (Ir—Ta) mixed metal oxide (MMO). In some embodiments, cathode materials can be a conductive material that catalyzes hydrogen evolution. Examples of cathode materials include (but are not limited to): stainless steel mesh. Many embodiments include that electrochemical stripping reactors contain ion exchange membranes. Examples of ion exchange membranes include (but are not limited to): cation exchange membrane. The cation exchange membrane can be made of (but not limited) a gel polystyrene cross linked with divinylbenzene and modified with functional groups including (but not limited to) sulphonic acid. In some embodiments, cation exchange membranes can be about 0.45 mm in thickness. Several embodiments include that electrochemical stripping reactors contain gas permeable membranes. In certain embodiments, gas permeable membranes can be a hydrophobic material which allows passage of gaseous species and resistant to wetting by water. Examples of gas permeable membranes include (but are not limited to): PTFE or polyethylene. Polyethylene gas permeable membranes can have a pore size of about 0.3 microns in diameter, thickness of about 76 microns, and porosity of about 85%.

The nitrogen cycle is currently a linear economy that couples the energy-intensive Haber-Bosch process for synthesizing reactive nitrogen with energy- and chemical-intensive treatment processes for removing reactive nitrogen from wastewater. Most other nitrogen recovery technologies recover only a single product, typically acidic ammonium which can be (but is not limited to being) used as a fertilizer. Many embodiments expand the recovered products and provide the recovery of both acidic ammonium and alkaline ammonia. Several embodiments provide that the acidic ammonium can be (but is not limited to being) utilized as fertilizers. Some embodiments provide that the alkaline ammonia can be (but are not limited to being) used as household cleaners or feedstocks in various industries. By recovering alkaline ammonia, a number of embodiments reduce chemical inputs needed during nitrogen recovery (e.g., less acid is needed if less acidic ammonium fertilizer is generated).

Few scaled-up nitrogen recovery technologies are available and have been implemented. Electrochemical stripping reactors for ammonia and/or ammonium recovery could fill this gap and generate revenue from wastewater-derived products. In many embodiments, electrochemical stripping reactors for recovery of both acidic ammonium and alkaline ammonia can be installed in a wastewater treatment facility or other locations.

In many embodiments, wastewater-derived alkaline ammonia disinfectant can be compared to commercial ammonium hydroxide. Several embodiments focus on urine-derived alkaline ammonia disinfectant. Some embodiments measure concentrations of fecal indicator bacteria including (but not limited to) *E. coli* and *E. faecalis*, using techniques including (but not limited to) quantitative polymerase chain reaction (qPCR). Inactivation curves can be determined from batch tests conducted with each disinfectant-species pair in triplicate at several contact times in certain embodiments. Several embodiments provide that no significant differences can be observed in inactivation rate constants between urine-derived and commercial ammonia disinfectants.

The reactors may be sampled after inactivation studies with sterile protocols several times during one day, daily for one week, weekly for one month, and monthly for six months to evaluate the potential of regrowth. Bacterial counts and disinfectant concentrations can be adjusted before regrowth if there are differences in disinfection kinetics. Several embodiments provide that no significant differences can be observed in regrowth rates between urine-derived and commercial ammonia disinfectants.

Many embodiments provide reactor design modifications, scale-up, and economic analysis. In many embodiments, electrochemical stripping reactors can treat synthetic and/or real influent wastewaters. Several embodiments modify operating conditions to reduce energy consumption and improve removal and recovery performance through (but not limited to) electrolyte modifications. Certain embodiments provide improvement of long-term performance of the process when exposed to variable influent wastewater characteristics. A number of embodiments provide optimal scales for electrochemical stripping reactors, along with application in decentralized and centralized treatment settings. Some embodiments can be used to support field testing of ammonia and/or ammonium recovery. Several embodiments provide the lifetime and failure modes of electrochemical cell components including (but not limited to) membranes and electrodes. Many embodiments provide life-cycle analysis to evaluate the effect of acidic ammonium and alkaline ammonia recovery on environmental impacts associated with nitrogen management.

Three-Chamber Electrochemical Stripping Reactor

Electrochemical stripping in a three-chamber reactor has been demonstrated to effectively remove and recover ammonia nitrogen in urine and hydrothermal liquefaction effluent as ammonium sulfate fertilizer (See, e.g. Tarpeh, W. A. et al., *Environmental Science & Technology,* 2018, 52, 1453-1460; Li, Y., et al., *Environmental Science & Technology,* 2018, 52, 12717-12727; the disclosures of which are incorporated herein by reference). The process is operated in continuous mode in a lab environment, achieving consistent removal and recovery efficiencies (both 91% for real wastewater for anode feeding) and high product concentration (1,350 mg/L N, 3.7 times the influent concentration for anode feeding with real wastewater).

Three-chamber electrochemical reactors are made from Plexiglass frames and contain a cation exchange membrane, gas permeable membrane, an anode, and a cathode. As shown in FIG. 1, influent is introduced into the first anode or cathode. During 7-hour chronopotentiometric operation at a current density of about 10 mA/cm$^2$, the reactors are operated in batch and continuous (hydraulic retention time or HRT of 1.22 hours) modes using ammonium salt solutions, synthetic wastewater, and real wastewater (FSTP effluent) as influent. Total ammonia nitrogen (TAN) concentration is measured in each chamber at regular time intervals via ion chromatography (Dionex ICS-6000 DC, IonPac CG16) to determine fluxes and efficiencies for nitrogen removal and recovery. The full-cell potential between anode and cathode is monitored regularly to estimate energy consumption.

Figure 2A:
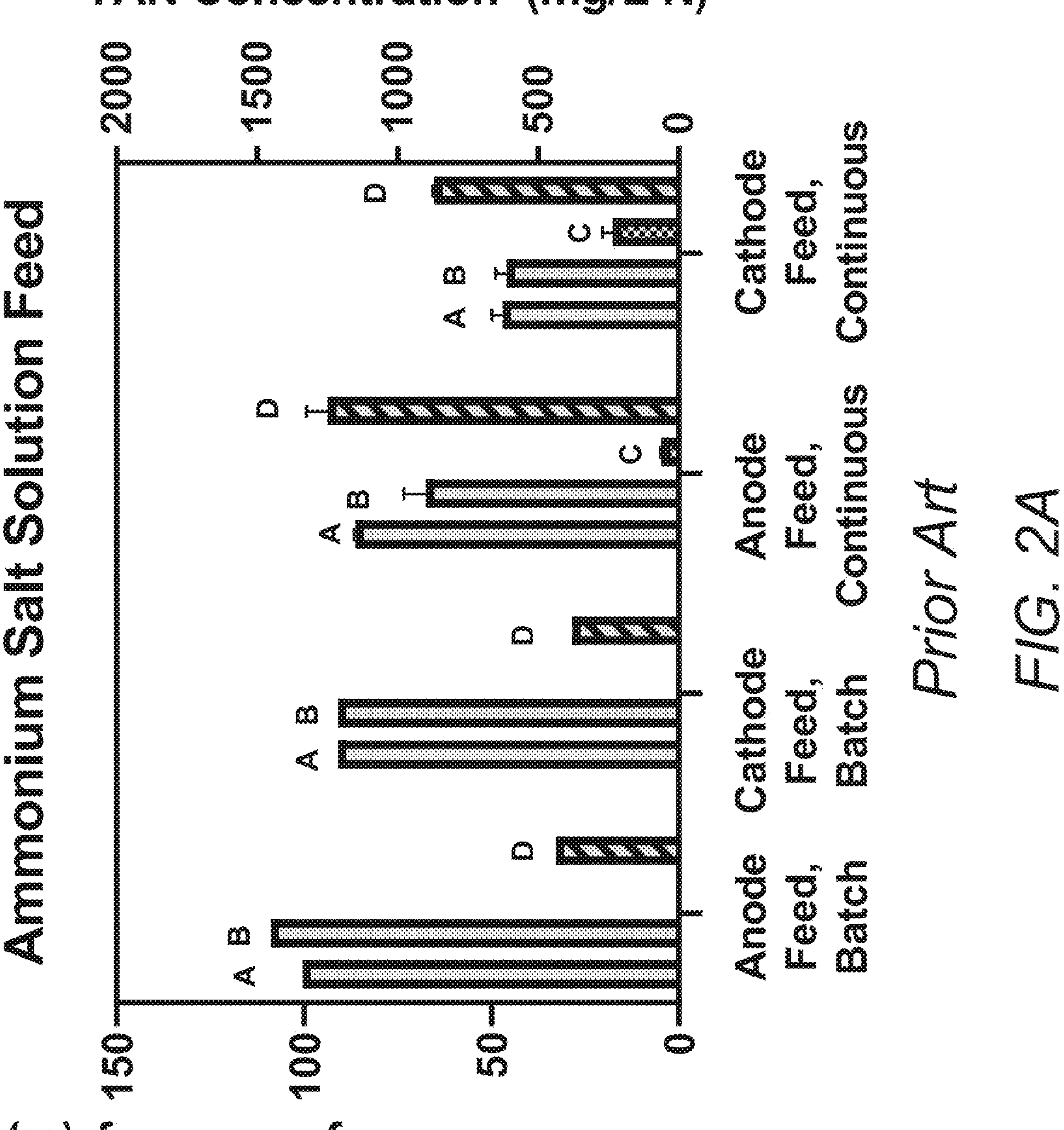
FIG. 2A illustrates final (for batch operation) and steady-state (for continuous operation) removal and recovery efficiencies and total ammonia nitrogen (TAN) concentrations in feed and trap chambers for experiments using ammonium salt solution as influent in accordance with the prior art.

The influent ammonium salt solutions have TAN concentrations of about 410 mg/L N for all three-chamber reactor experiments (FIG. 2A) to match typical TAN concentrations in the FSTP effluent. In FIG. 2A, each of the four groups (anode feed batch, cathode feed batch, anode feed continuous, and cathode feed continuous) has four bars. Bar A represents removal efficiency; bar B represents recovery efficiency; bar C represents feed chamber concentration; and bar D represents trap concentration. When ammonium is fed into the anode (chamber 1) in batch operation, complete removal and recovery were achieved within 1.5 and 4 hours, respectively. During cathode-feed batch operation, the maximum removal and recovery reached 91% within 5 hours. During continuous operation, steady-state removal and recovery efficiencies for anode feeding are 86% and 68%, respectively, compared to a steady-state removal/recovery efficiency of 47% for cathode feeding. For anode feeding, a concentration of 1,250 mg/L N (concentration factor of 3.1) accumulated in the trap (chamber 3) after 7.3 hours, compared to 870 mg/L N (concentration factor of 2.1) for cathode feeding. Fluxes achieved during anode feeding (150 g N/m$^2$-d from anode to cathode and 130 g N/m$^2$-d from cathode to trap) exceeded those observed during cathode feeding (110 g N/m$^2$-d from cathode to trap).

Figure 2B:
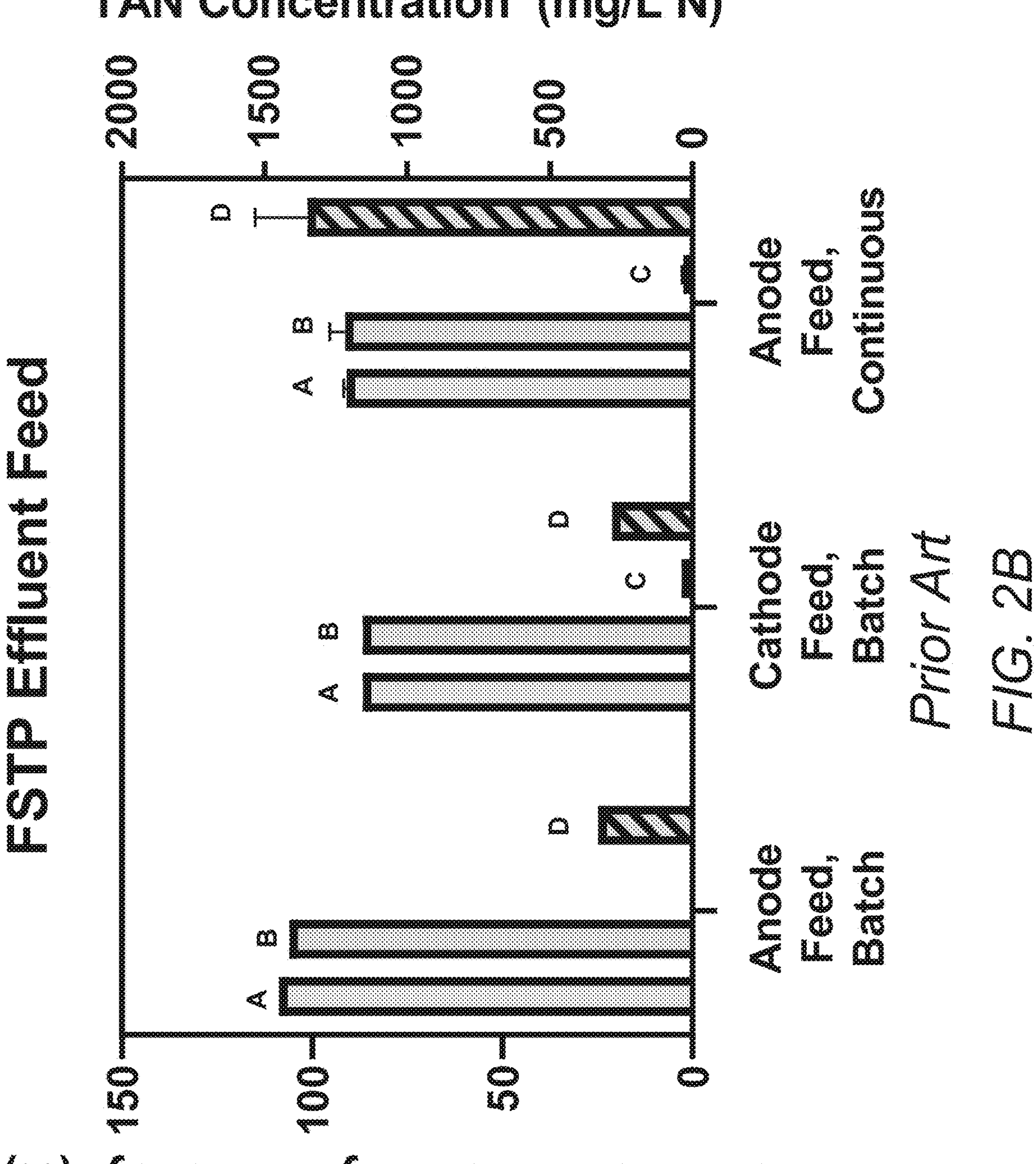
FIG. 2B illustrates final (for batch operation) and steady-state (for continuous operation) removal and recovery efficiencies and total ammonia nitrogen (TAN) concentrations in feed and trap chambers for experiments using FSTP effluent as influent in accordance with the prior art.

When FSTP effluent is fed into the anode in batch operation, complete removal is achieved within 1 hour and complete recovery is achieved within 4 to 5 hours (FIG. 2B). In FIG. 2B, each of the three columns (anode feed batch, cathode feed batch, and anode feed continuous) has four bars. Bar A represents removal efficiency; bar B represents recovery efficiency; bar C represents feed chamber concentration; and bar D represents trap concentration. During cathode-feed batch operation, the maximum removal/recovery reached 87% within 7 hours. During continuous operation, steady-state removal and recovery efficiencies for anode feeding are 91%. A concentration of 1,350 mg/L N (concentration factor of 3.7) accumulates in the trap after 7.3 hours. Fluxes of 130 g N/m$^2$-d from anode to cathode and 140 g N/m$^2$-d from cathode to trap are observed.

Figure 3A:
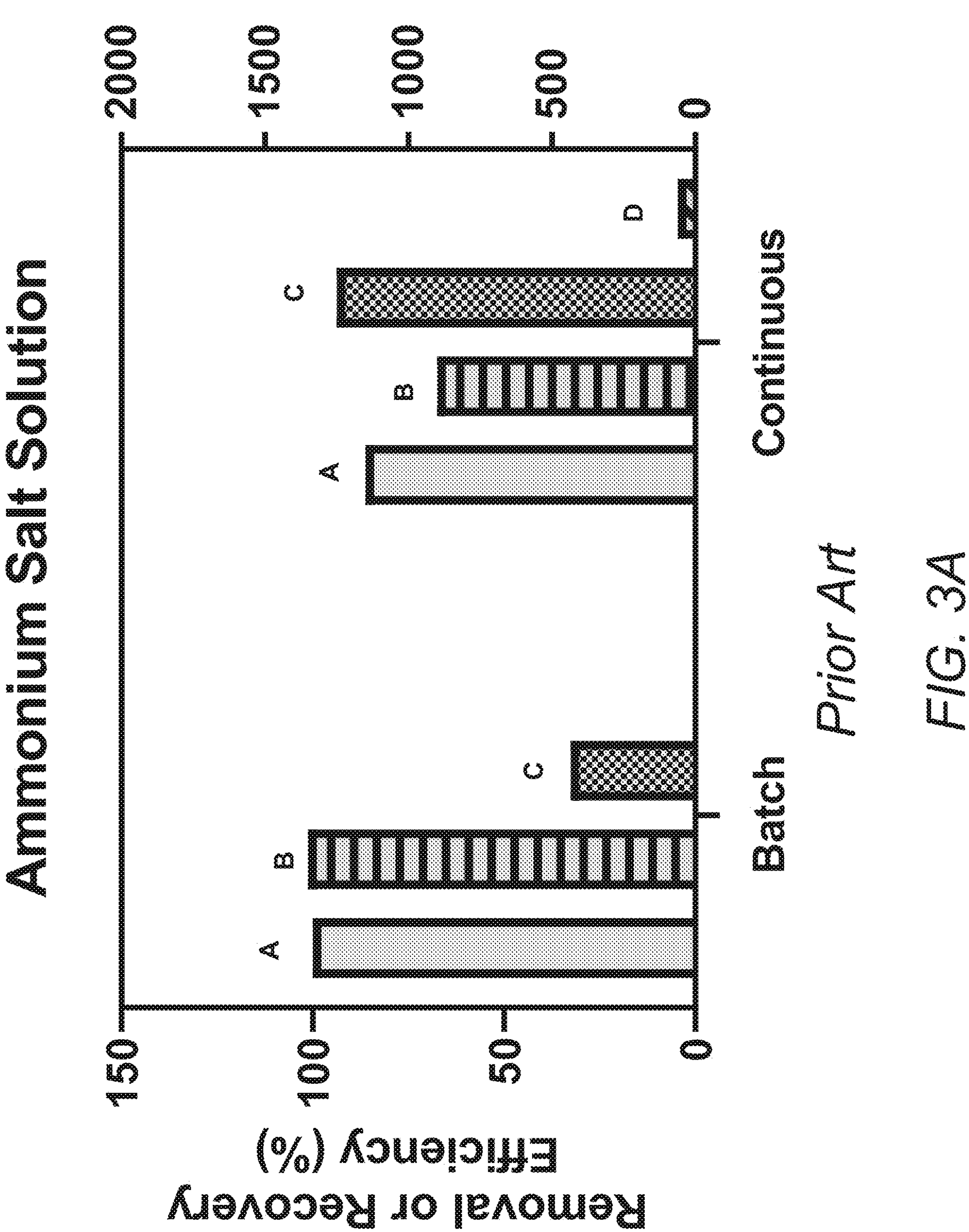
FIG. 3A illustrates final (for batch operation) and steady-state (for continuous operation) removal and recovery efficiencies and total ammonia nitrogen (TAN) concentrations in feed and trap chambers for experiments using ammonium salt solution as influent for three-chamber reactor in accordance with the prior art.

FIG. 3A illustrates a final (for batch operation) and steady-state (for continuous operation) removal and recovery efficiencies and final TAN concentrations using ammonium salt solution as influent for a three-chamber reactor. Both the batch operation column (left) and the continuous operation column (right) have four bars. Bar A represents removal efficiency; bar B represents recovery efficiency; bar C represents trap concentration; and bar D represents feed chamber concentration.

Figure 3B:
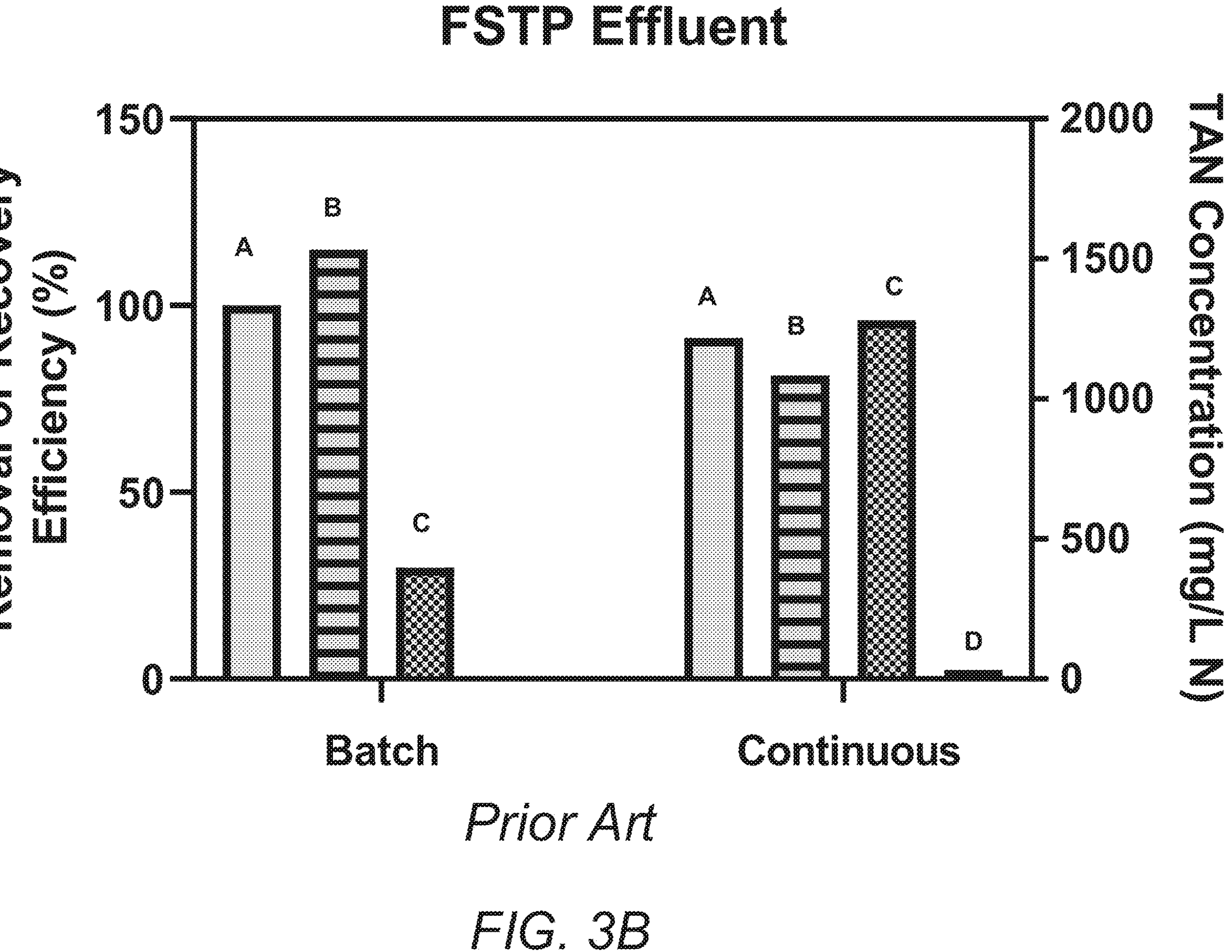
FIG. 3B illustrates final (for batch operation) and steady-state (for continuous operation) removal and recovery efficiencies and total ammonia nitrogen (TAN) concentrations in the feed and trap chambers using ammonium FSTP effluent as influent for three-chamber reactor in accordance with the prior art.

FIG. 3B illustrates a final (for batch operation) and steady-state (for continuous operation) removal and recovery efficiencies and final TAN concentrations using ammonium FSTP effluent as influent for a three-chamber reactor. Both the batch operation column (left) and the continuous operation column (right) have four bars. Bar A represents removal efficiency; bar B represents recovery efficiency; bar C represents trap concentration; and bar D represents feed chamber concentration.

Batch and continuous experiments for the three-chamber reactor indicate that anode feeding facilitates higher removal and recovery efficiencies in shorter times, higher membrane fluxes, lower effluent concentrations, and higher product concentrations than cathode feeding. Other drawbacks of cathode feeding include the need to periodically replenish anolyte, the risk of increased fouling of the hydrophobic gas permeable membrane due to the presence of organic matter in wastewater, and potential interference of the buffering capacity of wastewater with achieving the high pH needed for ammonia volatilization.

Performance of the three-chamber reactor in batch and continuous mode is similar for ammonium salt solution and real FSTP effluent, indicating that the complex wastewater matrix does not substantially interfere with effectiveness of nitrogen removal and recovery. However, during continuous operation with anode feeding, nitrogen flux from anode to cathode is lower for real wastewater than ammonium salt solutions. Fouling of the cation exchange membrane could restrict movement of cations from the anode to cathode chamber.

Four-Chamber Flexible Electrochemical Stripping Reactor

A rate-limiting step of electrochemical ammonia recovery has been posited to be volatilization of ammonia. In electrochemical stripping, this obstacle can be overcome with gas-permeable membranes and acid traps to recover acidic ammonium sulfate solution in accordance with many embodiments. To recover alkaline ammonia disinfectant, many embodiments may use gas permeable membranes including (but not limited to) polypropylene membranes without the acid. Several embodiments provide the effect of three setups on ammonia recovery: (1) air stripping in the trap chamber, (2) heating the catholyte, and (3) feeding wastewater into the cathode. Ammonia recovery can be determined for each setup for ideal ammonium sulfate and real wastewater.

Figure 4:
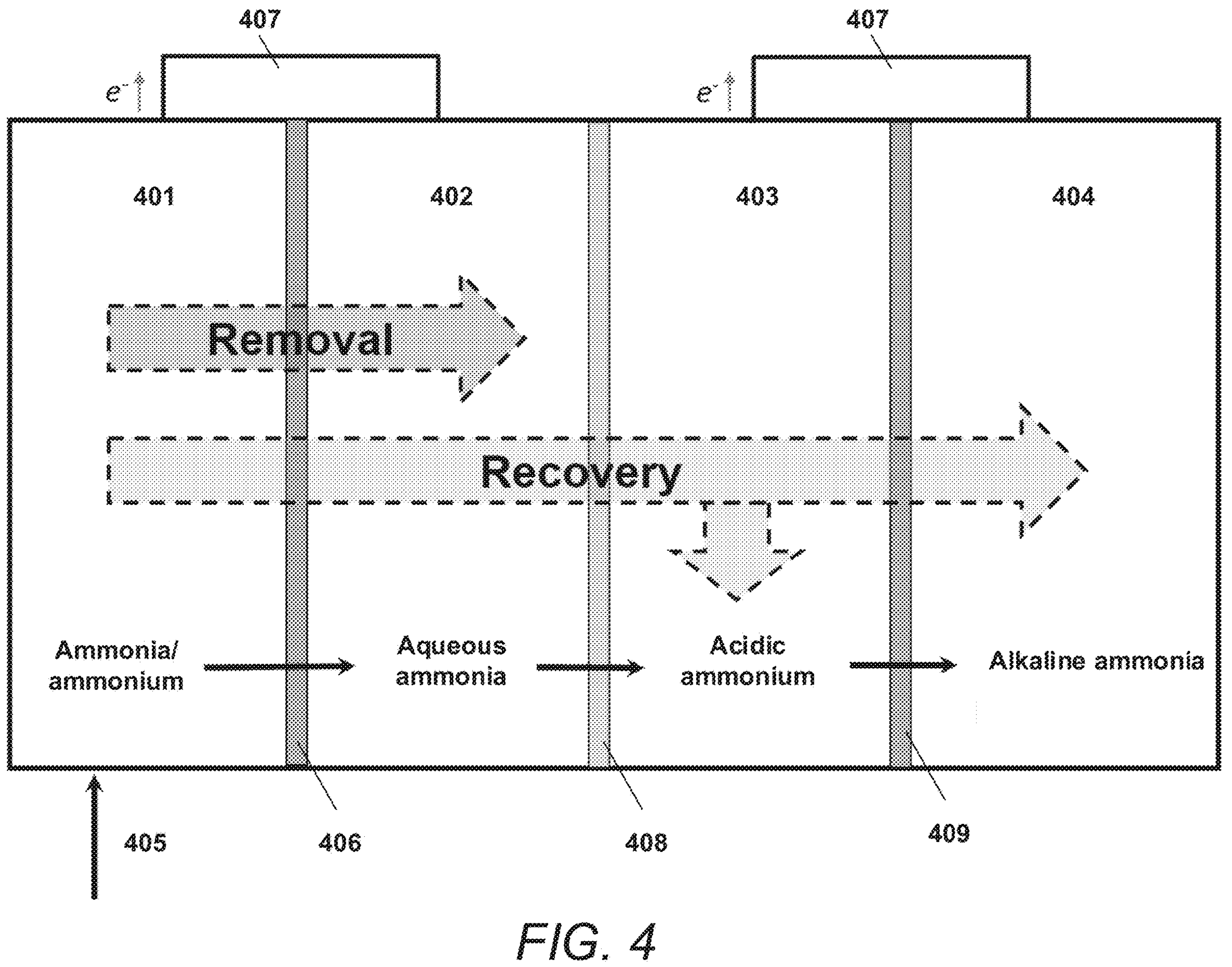
FIG. 4 illustrates a process schematic of a four-chamber flexible electrochemical stripping (FECS) reactor for recovery of ammonium in wastewater as acidic ammonium and alkaline ammonia in accordance with embodiments.

Many embodiments provide four-chamber flexible electrochemical stripping (FECS) reactors for acidic ammonium and alkaline ammonia recovery. A four-chamber electrochemical stripping reactor in accordance with an embodiment of the invention is illustrated in FIG. 4. An FECS reactor can have four chambers shown as chamber 1 (401), chamber 2 (402), chamber 3 (403), and chamber 4 (404) in FIG. 4. Nitrogen-rich wastewater (405) can be added to the FECS reactor and flowed through chamber 1 (401). Chamber 1 (401) and chamber 3 (403) can each have at least one anode. Oxidation reactions at the anode may lower the pH of chamber 1 and chamber 3. Both chamber 1 and chamber 3 can have a low pH. Chamber 2 (402) and chamber 4 (404) can each have at least one cathode. Reduction reactions at the cathode may increase the pH of chamber 2 and chamber 4. Both chamber 2 and chamber 4 can have a high pH. Ammonia in the nitrogen-rich wastewater (405) can be protonated in chamber 1 (401) due to the low pH in chamber 1 (401). Protonated ammonia can be transferred to chamber 2 (402) through a cation exchange membrane (406). Protonated ammonia can form aqueous ammonia in chamber 2 due to the high pH in chamber 2 (402). Electrons can be transferred from chamber 1 to chamber 2 through an outside circuitry (407). The processes in chamber 1 and chamber 2 can be part of ammonia removal processes. Aqueous ammonia in chamber 2 (402) can volatilize, and gaseous ammonia can be transferred to chamber 3 (403) through a gas permeable membrane (408). Gaseous ammonia can dissolve and be recovered to form acidic ammonium in chamber 3 (403) due to the low pH in chamber 3. Chamber 3 (403) can contain an acidic solution either as received from chamber 2 or electrochemically produced. Acidic ammonium recovered in chamber 3 can be collected and/or transferred to chamber 4 (404) through a cation exchange membrane (409). Chamber 4 can contain a salt solution. Acidic ammonium can be neutralized in chamber 4 due to the high pH in chamber 4 and can be recovered to form alkaline ammonia in chamber 4. The recovered alkaline ammonia in chamber 4 can be collected. Electrons can be transferred from chamber 3 to chamber 4 through an outside circuitry (407).

Several embodiments provide that the FECS performance can be evaluated by TAN removal and recovery efficiency. In some embodiments, removal efficiency may quantify the fraction of influent TAN that leaves chamber 1. In certain embodiments, recovery efficiency may quantify the fraction of influent TAN that is captured in chambers 3 and 4. In some embodiments, the FECS reactor can be made from Plexiglass frames. In several embodiments, the FECS can contain cation exchange membranes, gas permeable membranes, $Ti/IrO_2$—$Ta_2O_5$ mesh anodes, and stainless steel mesh cathodes.

Several embodiments include that FECS recovers nitrogen as ammonium sulfate and/or ammonium hydroxide based on charge and volatility. Many embodiments exhibit flexible alkaline ammonium and acidic ammonia recovery. Several embodiments can control product distribution by controlling timing of operation of electrochemical cells comprising an FECS reactor. Some embodiments demonstrate FECS can be a modular, all-in-one reactor that facilitates process control and on-site recovery. In several embodiments, FECS can reduce acid input compared to electrochemical stripping. In some embodiments, ammonium sulfate can be used as fertilizer or fertilizer ingredient, and ammonium hydroxide can be used as disinfecting reagent.

Figure 5:
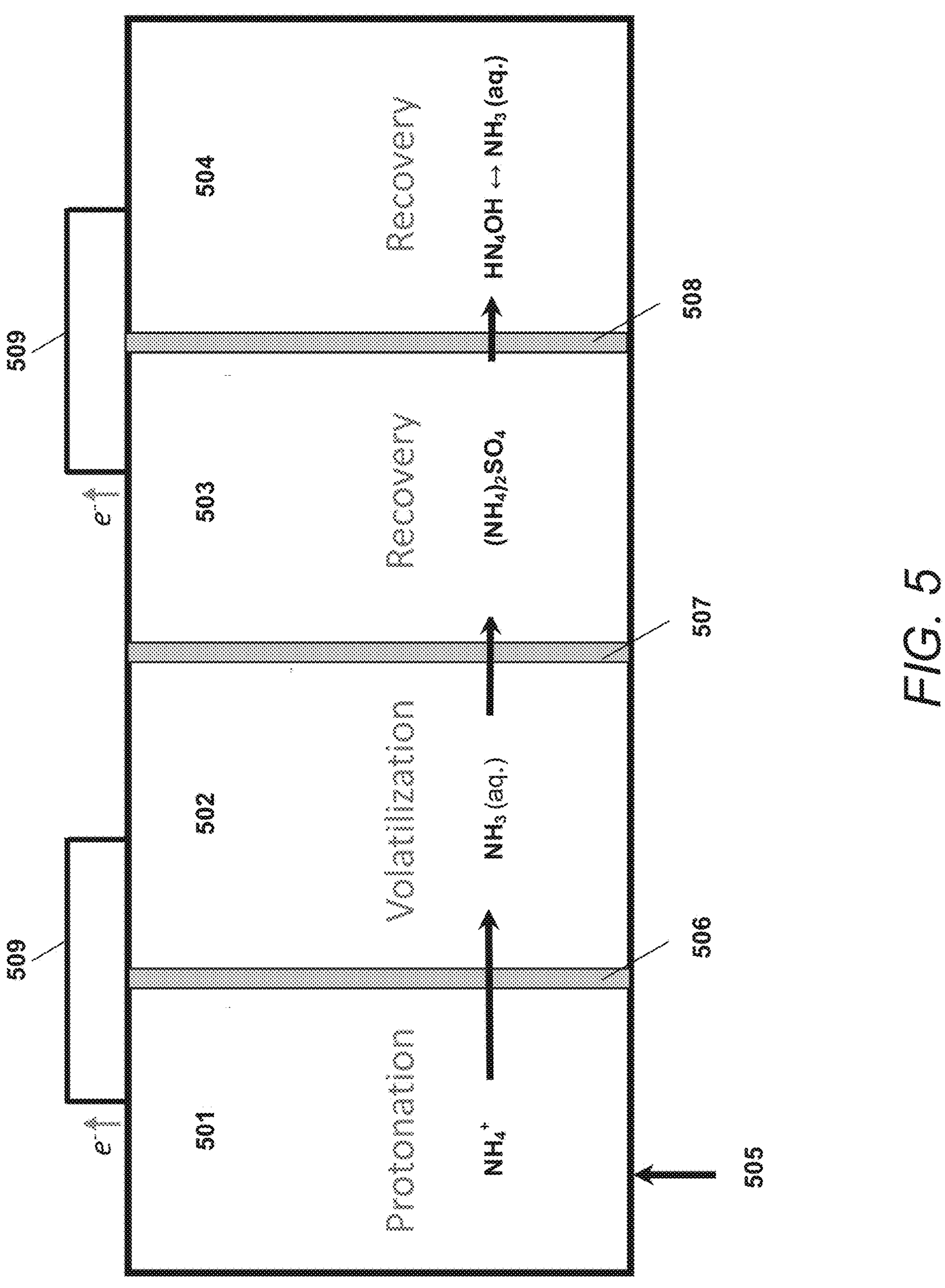
FIG. 5 illustrates a four-chamber flexible electrochemical stripping (FECS) reactor recovers nitrogen as ammonium sulfate and/or ammonium hydroxide based on charge and volatility in accordance with embodiments.
Figure 6:
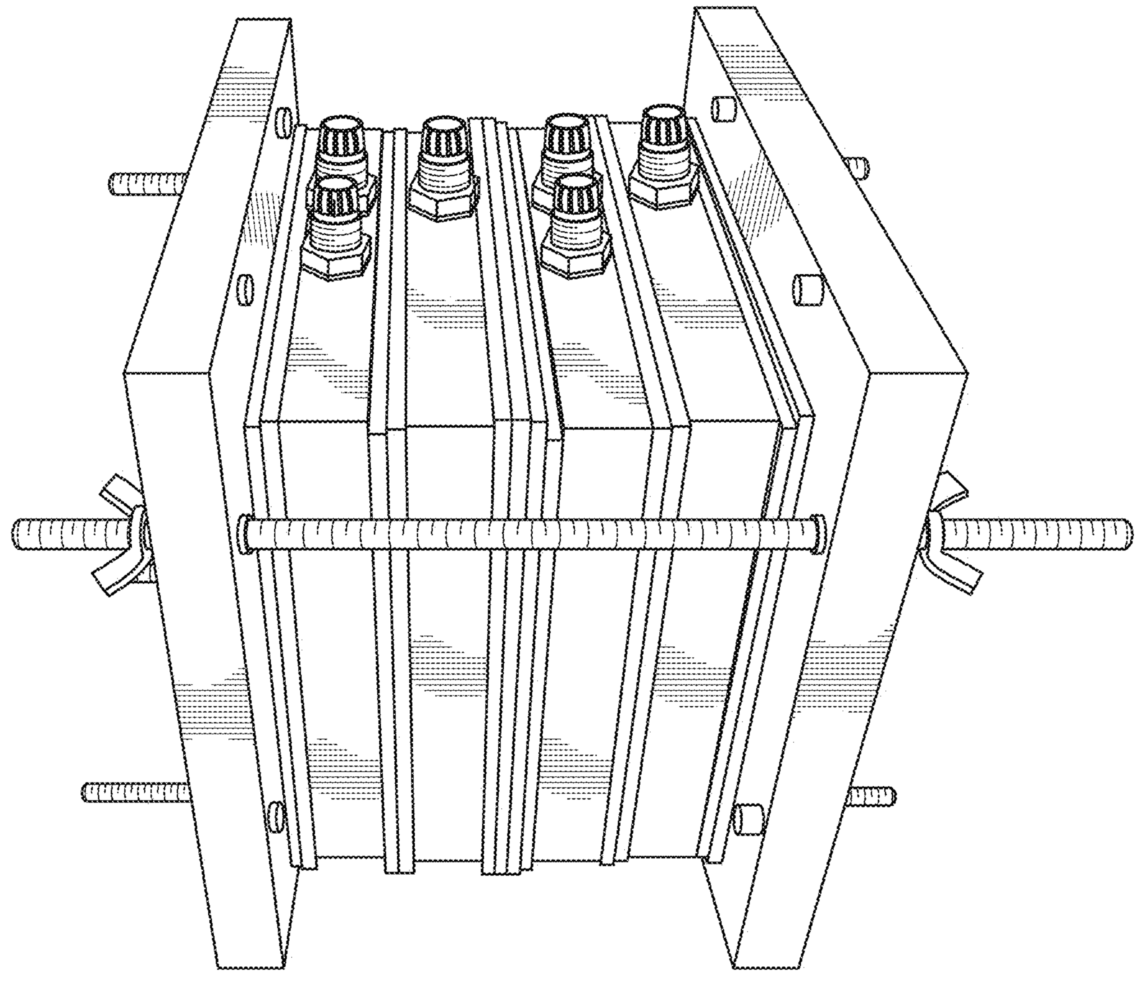
FIG. 6 illustrates a picture of a four-chamber flexible electrochemical stripping reactor in accordance with embodiments.

A four-chamber flexible electrochemical stripping reactor recovering ammonium sulfate and ammonium hydroxide in accordance with an embodiment of the invention is illustrated in FIG. 5. The reactor can have four chambers shown as chamber 1 (501), chamber 2 (502), chamber 3 (503), and chamber 4 (504) in FIG. 5. In several embodiments, nitrogen-rich wastewater (505) can be added into chamber 1 (501). There is at least one anode in chamber 1 (501). Water oxidation reaction ($2H_2O \rightarrow O_2+4H^++4e^-$) at the anode of chamber 1 can produce protons ($H^+$). The acidic environment (low pH) in chamber 1 (501) can protonate ammonia from the nitrogen-rich wastewater (505). The protonation process can form ammonium ($NH_{4^+}$). $NH_{4^+}$ can be transferred from chamber 1 (501) to chamber 2 (502) through a cation exchange membrane (506). Chamber 2 (502) can include at least one cathode. Reduction reactions ($O_2+2H_2O+4e^- \rightarrow 4OH^-$ and $2H^++2e^- \rightarrow H_2$) at the cathode of chamber 2 (502) can produce hydroxide ions ($OH^-$). The alkaline pH (high pH) in chamber 2 (502) can produce aqueous ammonia $NH_3$ (aq.) and enable volatilization. Chamber 2 can contain a salt solution including (but not limited to) 0.1 M NaCl solution. Aqueous ammonia can volatilize and gaseous ammonia can transfer from chamber 2 (502) to chamber 3 (503) through a gas permeable membrane (507). Chamber 3 (503) can include at least one anode. Water oxidation reaction ($2H_2O \rightarrow O_2+4H^++4e^-$) at the anode of chamber 3 can produce protons ($H^+$). Chamber 3 (503) can contain an acidic solution including (but not limited to) 0.1 M $H_2SO_4$. The acidic environment (low pH) can recover ammonia and form acidic ammonium, such as ammonium sulfate ($(NH_4)_2SO_4$). Ammonium can transfer from chamber 3 (503) to chamber 4 (504) through a cation exchange membrane (508). Chamber 4 can include at least one cathode. Reduction reactions ($O_2+2H_2O+4e^- \rightarrow 4OH^-$ and $2H^++2e^- \rightarrow H_2$) at the cathode of chamber 4 (504) can produce hydroxide ions ($OH^-$). Chamber 4 (504) can contain a salt solution including (but not limited to) 0.1 M NaCl. The reduction reaction at the cathode in chamber 4 produces $OH^-$, hence creating an alkaline environment. The high pH can recover alkaline ammonia, such as ammonium hydroxide ($NH_4OH \leftrightarrow NH_3$ (aq.)). Electrons from redox reactions at the anodes and cathodes can go through circuits (509) from chamber 1 to chamber 2 and from chamber 3 to chamber 4. A picture of a four-chamber flexible electrochemical stripping reactor in accordance with an embodiment of the invention is illustrated in FIG. 6.

In many embodiments, FECS performance can be evaluated using two influents: an ideal ammonium phosphate solution and real FSTP effluent. In several embodiments, chronopotentiometric measurements can be conducted by applying a constant current density, in batch and/or continuous modes, for about 9 hours. During these measurements, pH as an online monitoring technique can be measured to ensure pH trends in each chamber are reasonable in accordance with some embodiments. Samples can be periodically collected from each chamber and ion chromatography can be used to quantify cation and anion concentrations in several embodiments. The TAN concentration can be important for evaluating removal and recovery performance. In some embodiments, anion concentrations can be used to ensure membrane integrity. In a number of embodiments, the full-cell voltage between each anode-cathode pair can be measured to assess energy consumption. Table 1 lists components, properties, and average concentration in FSTP effluent.

TABLE 1

FSTP EFFLUENT COMPONENT

| COMPONENT | AVERAGE CONCENTRATION IN FSTP EFFLUENT |
|---|---|
| TAN | 410 ± 12 mg/L N |
| Sodium | 280 ± 6 mg/L |
| Potassium | 110 ± 11 mg/L |
| Magnesium | 34 ± 7 mg/L |
| Calcium | 110 ± 15 mg/L |

TABLE 1-continued

| FSTP EFFLUENT COMPONENT | |
|---|---|
| COMPONENT | AVERAGE CONCENTRATION IN FSTP EFFLUENT |
| Chloride | 430 ± 40 mg/L |
| Phosphate | 77 ± 4 mg/L |
| Sulfate | 68 ± 7 mg/L |
| pH | 7.6 |
| Total COD | 760 mg/L |
| Conductivity | 4.4 mS/cm |

Many embodiments implement batch experiments in the four-chamber reactor (as shown in FIG. 4 and FIG. 5) with ammonium phosphate solution and/or FSTP effluent. Complete ammonium removal can occur within 2 hours under all conditions in accordance with embodiments. Some embodiments operate FECS under concurrent mode with electrical potential applied to all chambers. In such embodiments, ammonium can be recovered up to 100% from synthetic ammonium phosphate influent after 9 hours with about 13% as $(NH_4)_2SO_4$ in chamber 3 (503) and about 87% as $NH_4OH$ in chamber 4 (504). Results are similar for FSTP effluent. Several embodiments operate FECS under staggered mode where only the first electrochemical cell is operated for about 5 hours, and for the next 4 hours both electrochemical cells are operated. For treatment of ammonium phosphate, up to 80% ammonium recovery occurs after about 5 hours mainly as $(NH_4)_2SO_4$. After the next 4 hours, total recovery increased to up to 90%, distributed as about 65% $NH_4OH$ and about 25% $(NH_4)_2SO_4$. Timing of electrochemical cell operation can determine both total recovery efficiency and product distribution between $(NH_4)_2SO_4$ and $NH_4OH$. Selectively recovering nitrogen as two different products may expand the product portfolio for implementation toward a circular nitrogen economy.

Figure 7:
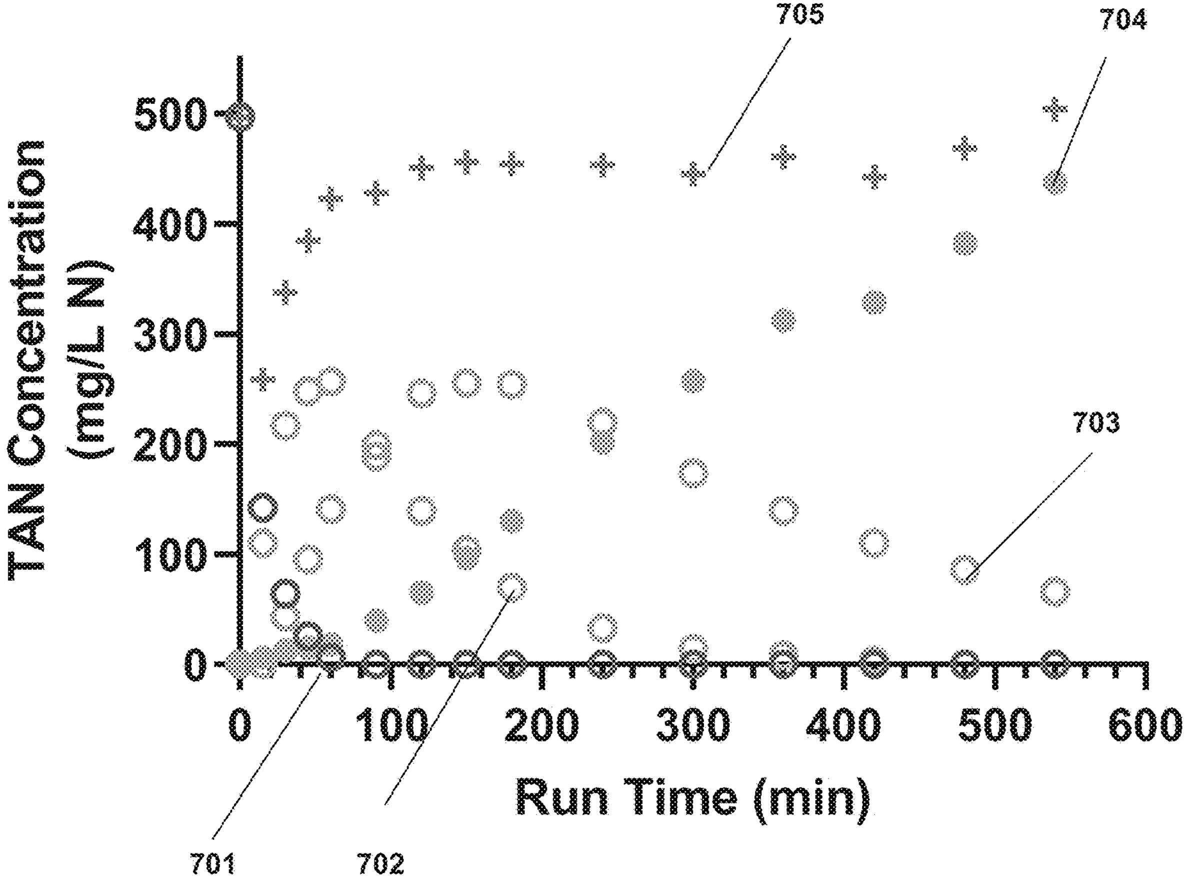
FIG. 7 illustrates TAN concentration profiles in four chambers during batch operation of a four-chamber flexible electrochemical stripping reactor using as an ammonium phosphate solution as influent in accordance with embodiments.

The four-chamber reactor is first operated in a concurrent mode with electrical potential applied to all four chambers as shown in FIG. 4. TAN concentration measured in each of the four chambers in a batch experiment using ammonium phosphate solution as influent in a four-chamber electrochemical stripping cell in accordance with an embodiment of the invention is illustrated in FIG. 7. TAN concentration in each chamber is shown over time. Ammonium phosphate solution influent can be flowed into chamber 1. TAN concentration in chamber 1 (701) indicates rapid removal of TAN from chamber 1. TAN concentration in chamber 2 (702) indicates a rapid initial increase, a peak, and a more gradual decline in chamber 2. This suggests that TAN transfer from chamber 2 to chamber 3 is slower than from chamber 1 to chamber 2. TAN concentration in chamber 3 (703) indicates a similar trend as in chamber 2. TAN concentration in chamber 4 (704) indicates a steady increase in TAN concentration in chamber 4. FECS can successfully recover ammonium hydroxide from this ideal influent. One trend to note is the total TAN concentration in the system (705). An initial dip in the TAN concentration occurs (705), as if TAN is temporarily lost from the system. Ammonium can be trapped in the cation exchange membrane (CEM) for some time because this dip is observed when using a thicker CEM.

Figure 8:
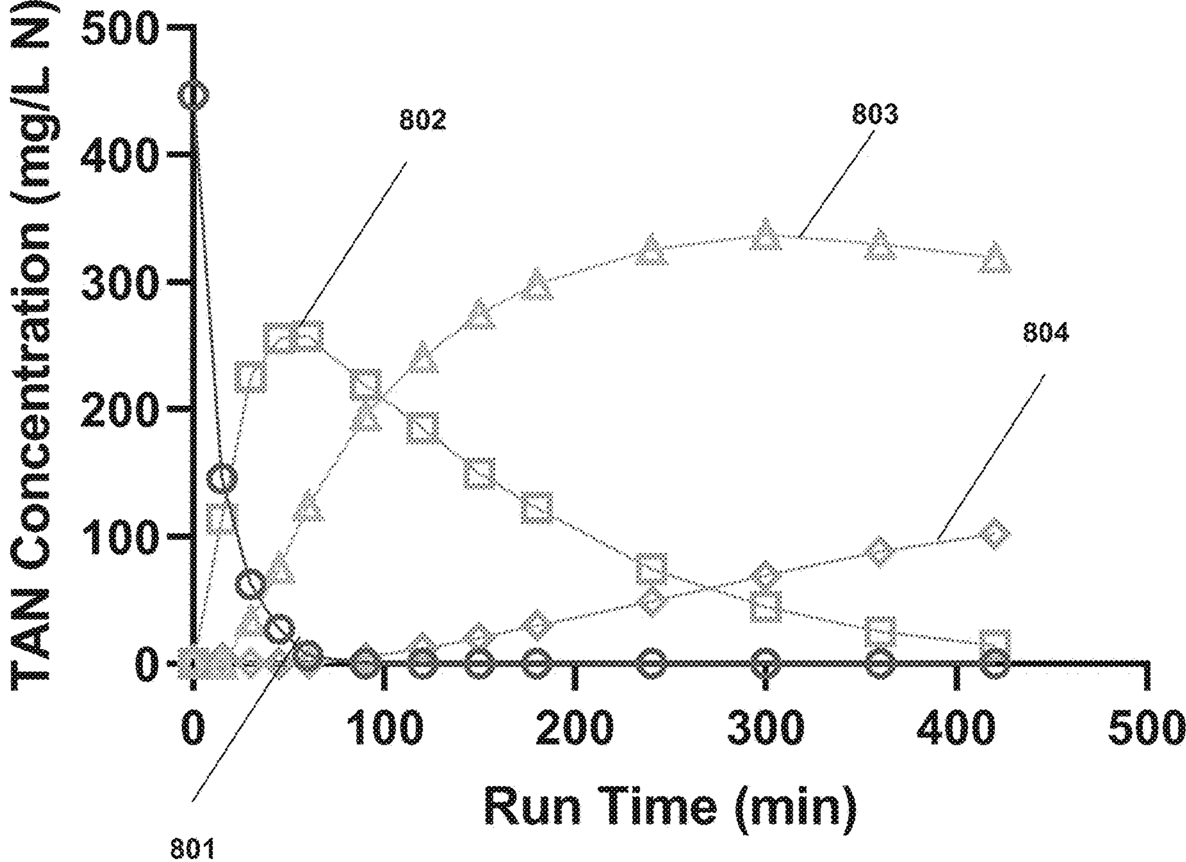
FIG. 8 illustrates TAN concentration profiles at anodes and cathodes of a four-chamber electrochemical stripping cell during batch operation in accordance with embodiments.

TAN concentration measured in each of the four chambers in a batch experiment using ammonium phosphate solution as influent in a four-chamber electrochemical stripping cell in accordance with an embodiment of the invention is illustrated in FIG. 8. Anode 1 (801) is the anode in chamber 1; cathode 1 is the cathode in chamber 2; anode 2 is the anode in chamber 3; and cathode 2 is the cathode in chamber 4. During batch testing of the four-chamber cell with ammonium salt solution introduced into anode 1 (801), complete removal from anode 1 (801) occurs within about 1.5 hours with some intermediate nitrogen accumulation occurring in cathode 1 (802). After about 7 hours, the majority of nitrogen has moved to anode 2 (803) and cathode 2 (804) with concentrations of about 320 mg/L TAN in anode 2 (803) and about 100 mg/L TAN in cathode 2 (804), amounting to a recovery efficiency of about 23%.

Figure 9:
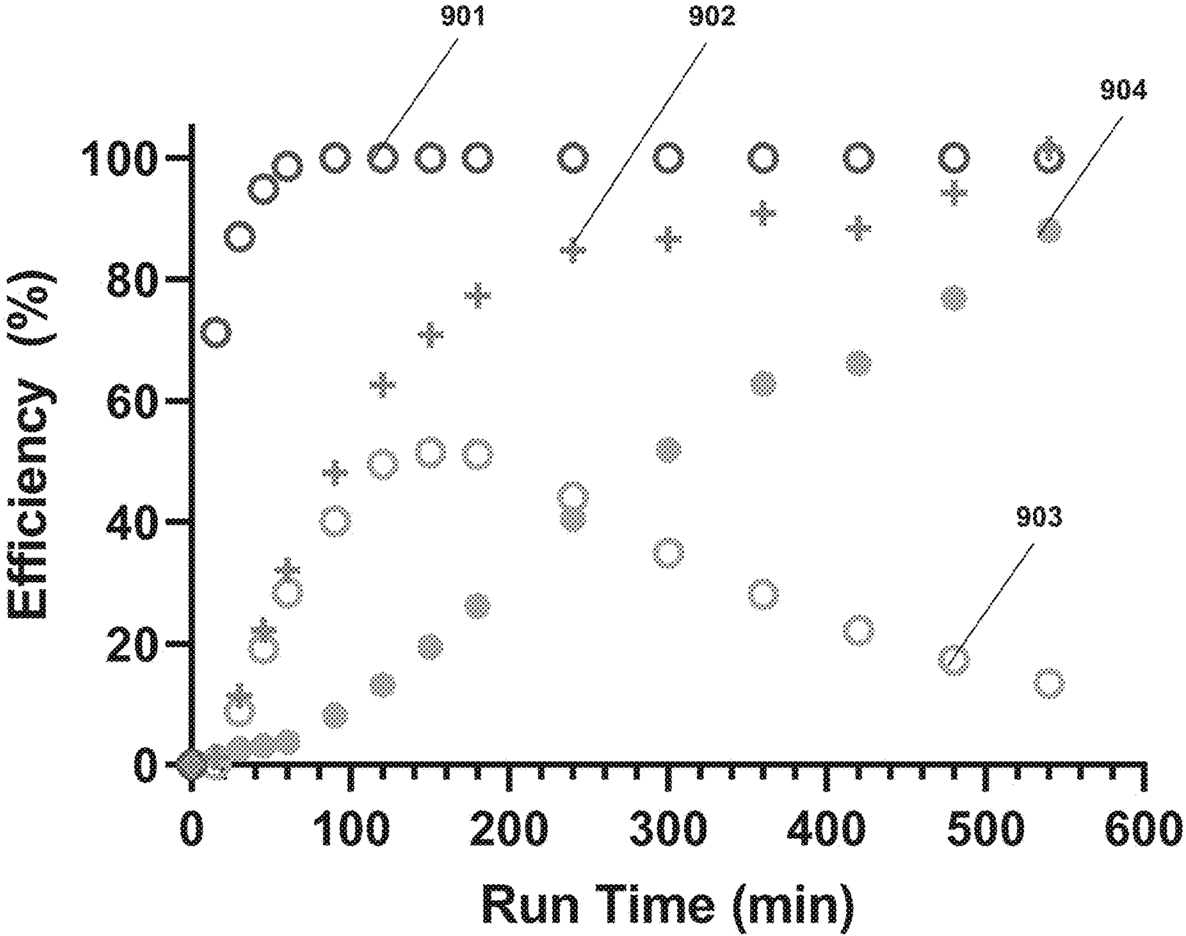
FIG. 9 illustrates removal and recovery efficiencies over time during batch operation of a four-chamber flexible electrochemical stripping reactor that selectively recovers ammonium sulfate and ammonium hydroxide products from ammonium phosphate solution in accordance with embodiments.

Recovery and removal efficiency in a batch experiment using ammonium phosphate solution as influent in a four-chamber flexible electrochemical stripping cell in accordance with an embodiment of the invention is illustrated in FIG. 9. During batch testing with ammonium salt solution introduced into chamber 1, complete removal occurs within about 1.5 hours as shown in removal efficiency (901). After about 9 hours, all TAN moved to chambers 3 and 4, indicating about 100% recovery as shown in total recovery efficiency (902), with recovery efficiencies of about 13% as ammonium sulfate (903, chamber 3) and about 88% as ammonium hydroxide (904, chamber 4).

Figure 10:
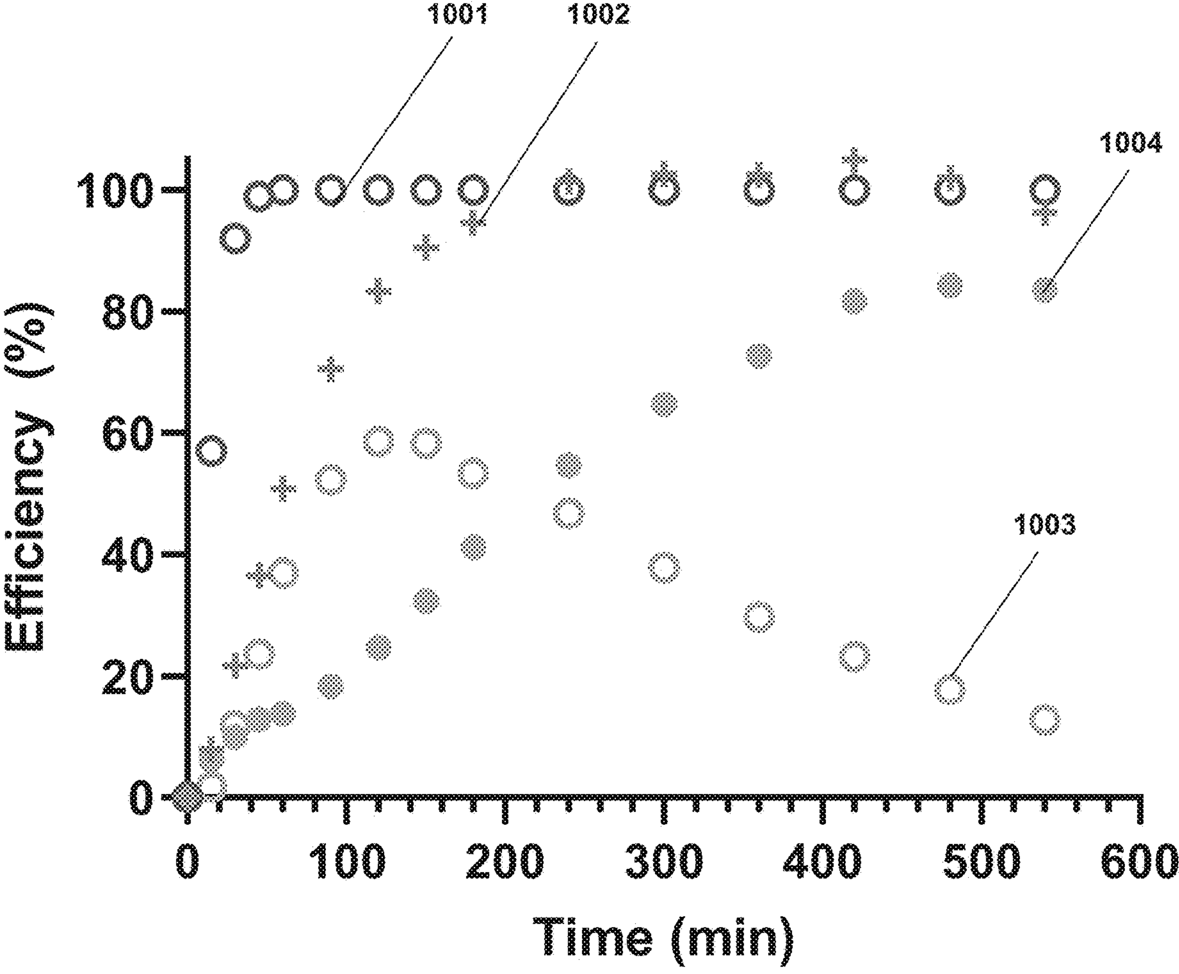
FIG. 10 illustrates removal and recovery efficiencies over time during batch operation of a four-chamber flexible electrochemical stripping reactor that recovers ammonium sulfate and ammonium hydroxide products from FSTP effluent in accordance with embodiments.

Recovery and removal efficiency in a batch experiment using FSTP effluent as influent in a four-chamber flexible electrochemical stripping cell in accordance with an embodiment of the invention is illustrated in FIG. 10. With FSTP effluent, almost complete removal of nitrogen occurs within about 1 hour as shown in removal efficiency (1001). Within about 9 hours, a total recovery efficiency of 97% can be achieved as shown in total recovery efficiency (1002), with recovery efficiencies of about 13% as ammonium sulfate (1003) and about 84% as ammonium hydroxide (1004).

Figure 11:
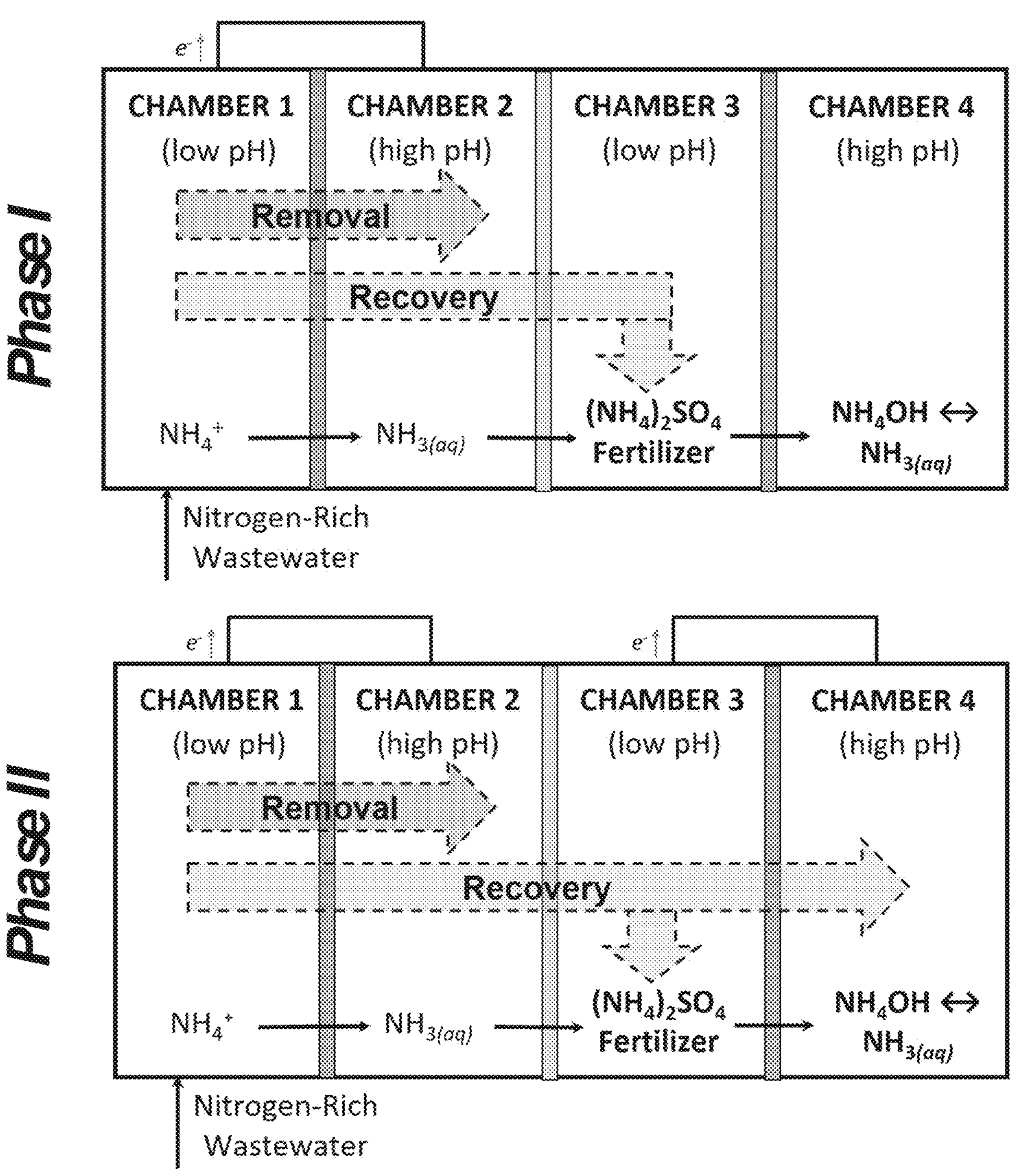
FIG. 11 illustrates phase I and phase II of a four-chamber flexible electrochemical stripping reactor operating under a staggered mode in accordance with embodiments.

Many embodiments provide that the multi-chamber reactors fed with ammonium salt solution can be operated in batch mode with staggered operation. A four-chamber electrochemical cell operating in batch mode with staggered operation in accordance with an embodiment is illustrated in FIG. 11. In staggered operation, the first electrochemical cell including chambers 1 and 2 can be operated for about 5 hours (phase I). For the next 4 hours, both electrochemical cells including chambers 1 through 4 can be operated (Phase II).

Figure 12:
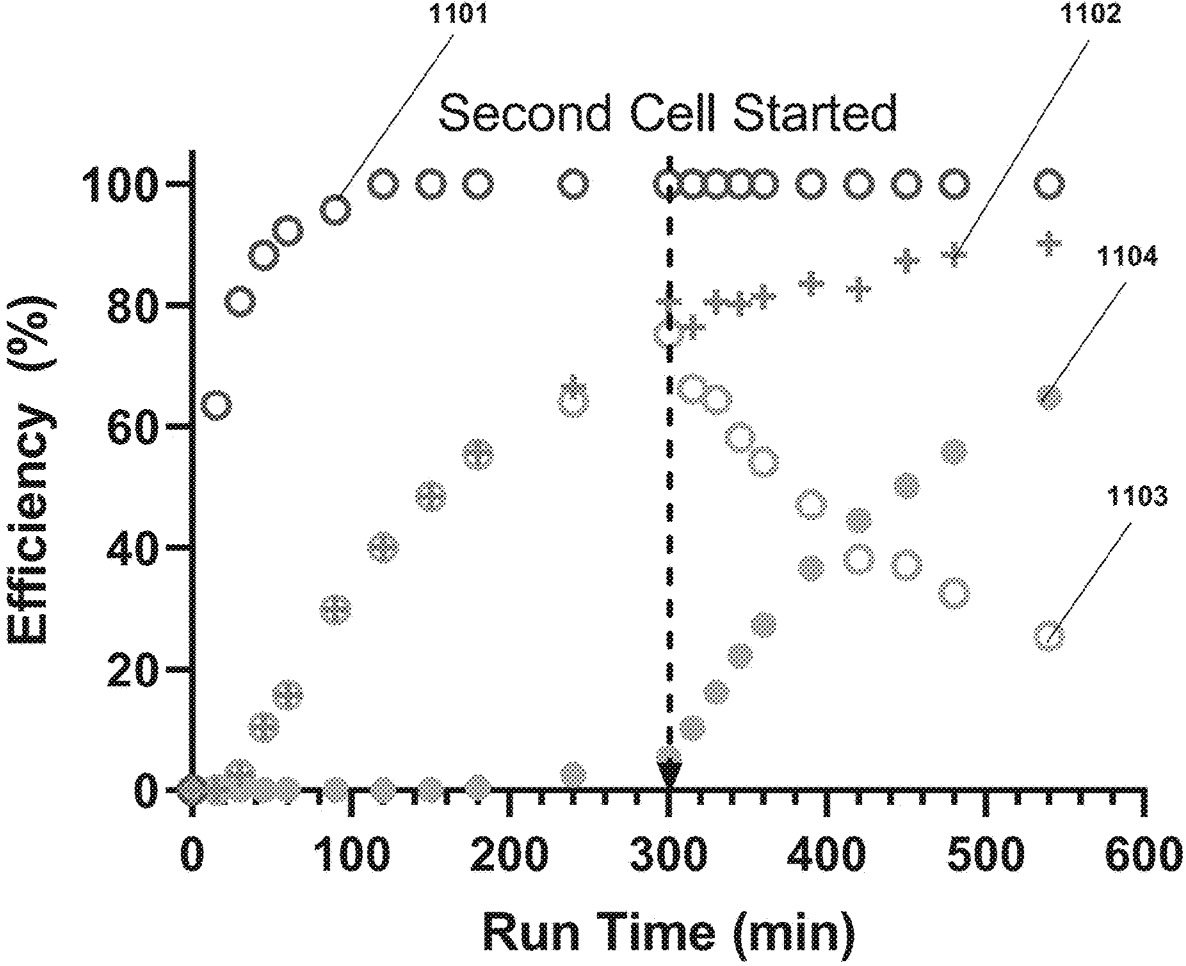
FIG. 12 illustrates removal and recovery efficiencies over time during batch operation of a four-chamber flexible electrochemical stripping reactor that allows selection of ammonium sulfate or ammonium hydroxide product recovered from ammonium phosphate solution in accordance with embodiments.

Recovery and removal efficiency in a batch experiment with staggered operation using FSTP effluent as influent in a four-chamber electrochemical stripping cell in accordance with an embodiment of the invention is illustrated in FIG. 12. Almost complete removal can be achieved within about 1.5 to 2 hours as shown in removal efficiency (1101). After about 5 hours, a total recovery efficiency of about 80% can be achieved as shown in total recovery efficiency (1102), with about 75% recovered as ammonium sulfate (1103) and about 5% recovered as ammonium hydroxide (1104). After the next 4 hours, the total recovery efficiency increases to about 90% (1102), distributed as about 65% ammonium hydroxide (1104) and about 25% ammonium sulfate (103). In many embodiments, the timing of operation of electrochemical cells can control the total recovery efficiency and the product distribution between fertilizer and disinfectant.

Figure 13:
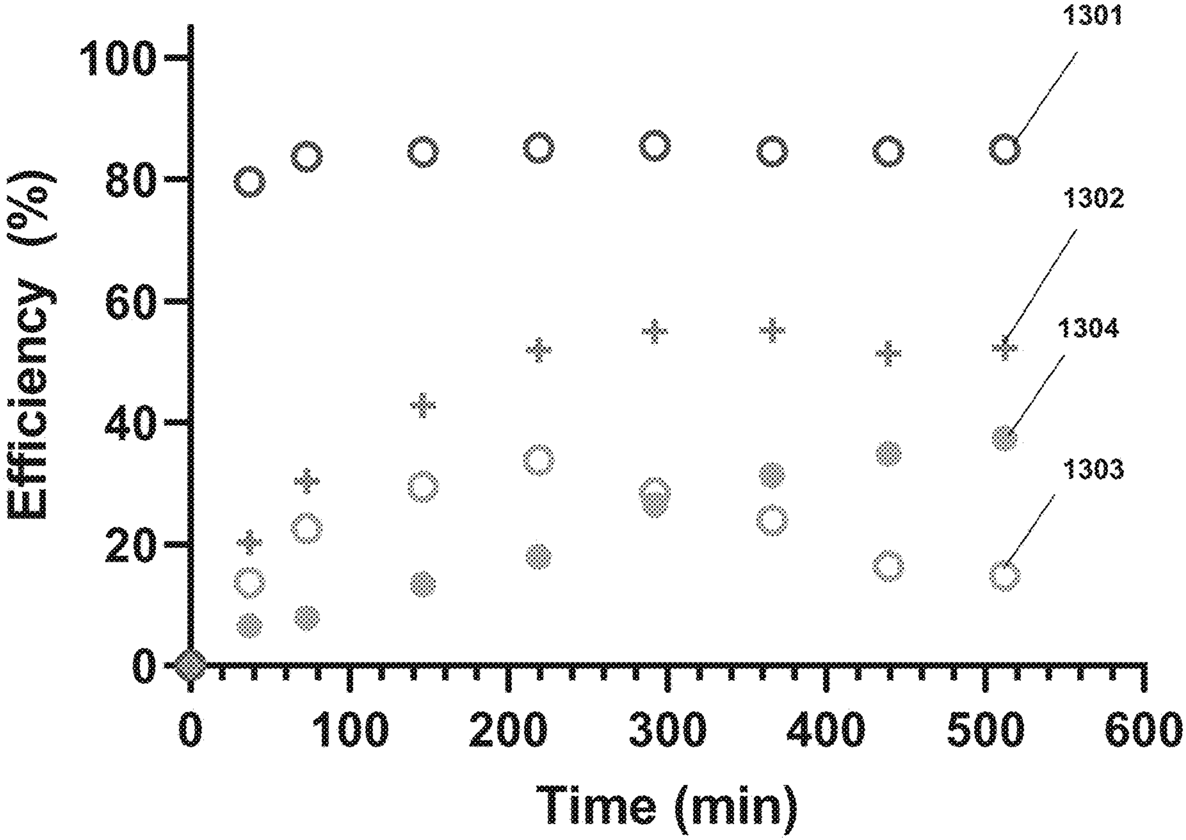
FIG. 13 illustrates removal and recovery efficiencies over time during continuous operation of a four-chamber flexible electrochemical stripping reactor that continuously recovers ammonium sulfate and ammonium hydroxide product from ammonium phosphate solution in accordance with embodiments.

In several embodiments, FECS can continuously recover ammonium sulfate and ammonium hydroxide product from ammonium phosphate solution. Steady-state recovery and removal efficiency in a batch experiment using ammonium phosphate solution as influent in a four-chamber flexible electrochemical stripping cell in accordance with an embodiment of the invention is illustrated in FIG. 13. The steady-state removal efficiency can be up to about 85% as shown in removal efficiency (1301). The steady-state recovery efficiency can be up to about 50% to about 55% as shown in total recovery efficiency (1302), with recovered ammonium sulfate from about 15% to about 35% (1303) and recovered ammonium hydroxide up to about 40% (1304).

Figure 14:
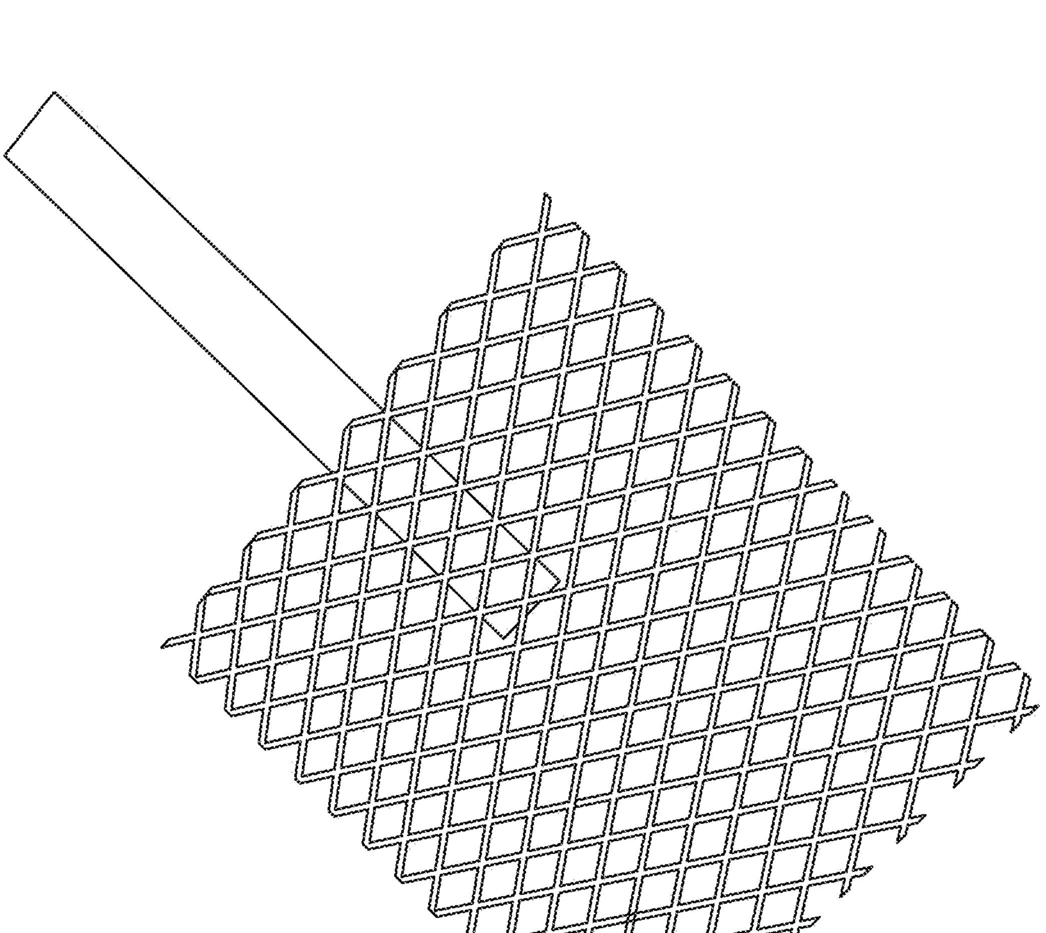
FIG. 14 illustrates a titanium mesh coated with Ir—Ta MMO used as an anode material for an electrochemical stripping cell in accordance with embodiments.
Figure 15:
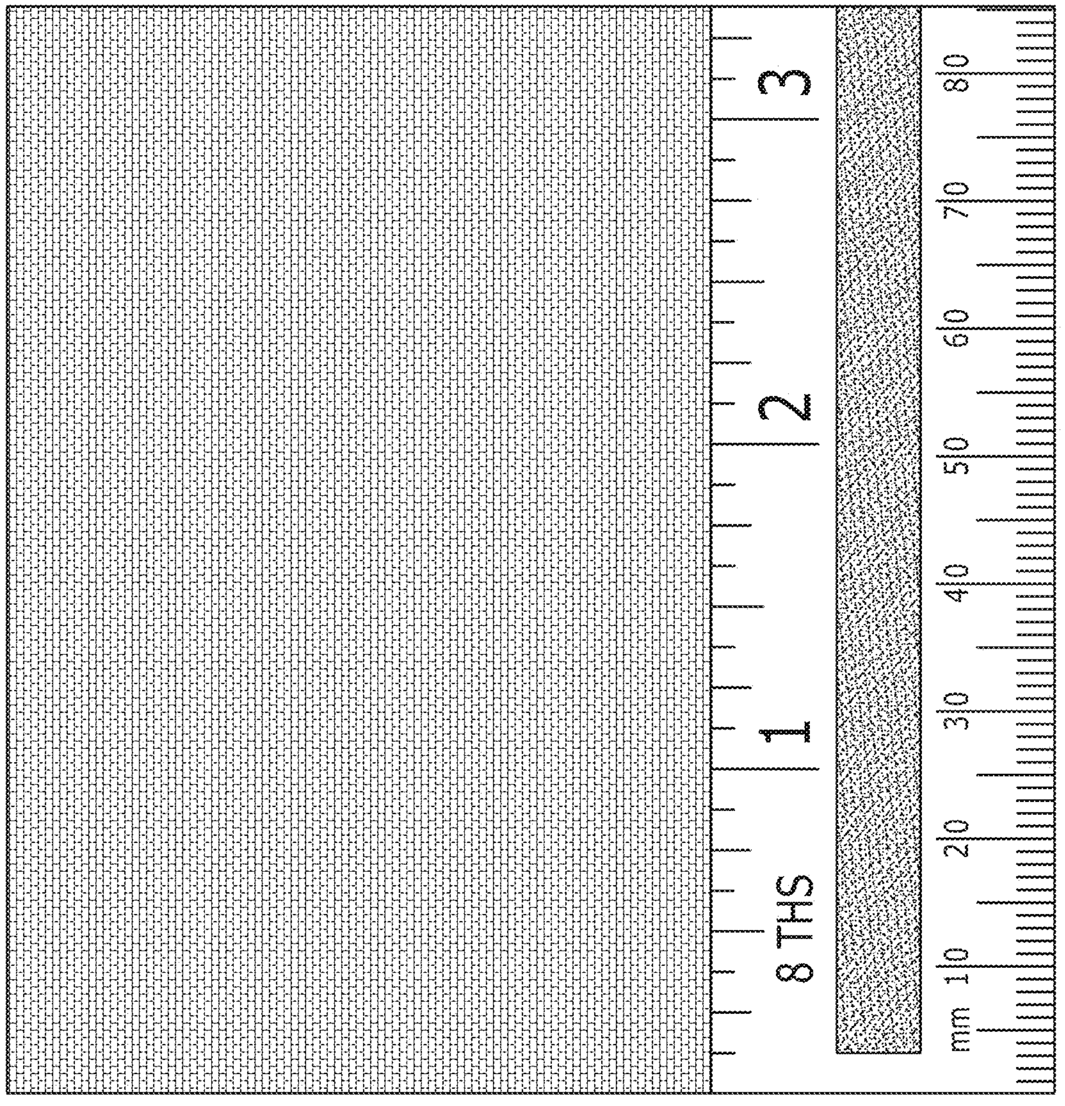
FIG. 15 illustrates a stainless steel mesh used as a cathode material for an electrochemical stripping cell in accordance with embodiments.

Many embodiments provide that at least one chamber may include an anode and at least one chamber may include a cathode. In some embodiments, anode materials can include (but are not limited to): titanium mesh coated with Iridium-Tantalum (Ir—Ta) mixed metal oxide (MMO). An anode made with titanium mesh coated with Ir—Ta MMO in accordance with an embodiment is illustrated in FIG. 14. In certain embodiments, cathode materials can include (but are not limited to): stainless steel mesh. A cathode made with stainless steel mesh in accordance with an embodiment is illustrated in FIG. 15.

Several embodiments provide measurements conditions. During about 7-hour chronopotentiometric experiments at a current density of about 10 mA/cm$^2$, the reactors can be operated in batch and continuous (hydraulic retention time or HRT of about 1.22 hours) modes using ammonium salt solutions, synthetic wastewater, and real wastewater (FSTP effluent) as influent respectively. Total ammonia nitrogen (TAN) concentration can be measured in each chamber at regular time intervals via ion chromatography (Dionex ICS-6000 DC, IonPac CG16) to determine nitrogen flux, removal, and recovery. The full-cell potential can be monitored regularly to estimate energy consumption.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An electrochemical stripping reactor for removing ammonia and ammonium and recovering acidic ammonium and alkaline ammonia comprising:

at least two anode chambers and each chamber comprising at least one anode;

at least two cathode chambers and each chamber comprising at least one cathode;

at least one cation exchange membrane; and at least one gas permeable membrane;

wherein the anode chambers and the cathode chambers are disposed in alternating arrangement, and the cation exchange membrane and the gas permeable membrane are disposed in alternating arrangement; wherein the cation exchange membrane is disposed between a first anode chamber and a first cathode chamber sequentially, and the gas permeable membrane is disposed between the first cathode chamber and a second anode chamber sequentially;

wherein at least the second anode chamber recovers acidic ammonium; and wherein at least a second cathode chamber recovers alkaline ammonia.

2. The electrochemical stripping reactor of claim 1, wherein the anode chambers have a lower pH value than the cathode chambers.

3. The electrochemical stripping reactor of claim 1, wherein the anode chambers have a pH value lower than 7 and the cathode chambers have a pH value higher than 7.

4. The electrochemical stripping reactor of claim 1, wherein an ammonia-containing aqueous stream influent is added to the first anode chamber or the first cathode chamber.

5. The electrochemical stripping reactor of claim 4, wherein the ammonia-containing aqueous stream influent is urine, municipal wastewater effluent, or fecal sludge treatment plant effluent.

6. The electrochemical stripping reactor of claim 1, wherein the reactor operates in a concurrent mode or a staggered mode.

7. The electrochemical stripping reactor of claim 1, wherein an ammonium removal efficiency is up to 100%.

8. The electrochemical stripping reactor of claim 1, wherein a total ammonium recovery efficiency is at least 90%.

9. The electrochemical stripping reactor of claim 1, wherein a distribution of a total ammonium recovery has controlled alkaline ammonia and acidic ammonium production.

10. The electrochemical stripping reactor of claim 1, wherein a total alkaline ammonium recovery efficiency is at least 65%.

11. The electrochemical stripping reactor of claim 1, wherein a total acidic ammonium recovery efficiency is at least 25%.

12. The electrochemical stripping reactor of claim 1, wherein the acidic ammonium is an ammonium salt.

13. The electrochemical stripping reactor of claim 12, wherein the ammonium salt is ammonium sulfate.

14. The electrochemical stripping reactor of claim 1, wherein the alkaline ammonia is ammonium hydroxide or aqueous ammonia.

15. The electrochemical stripping reactor of claim 1, wherein the anode comprises a conductive material that catalyzes oxygen evolution, wherein the cathode comprises a conductive material that catalyzes hydrogen evolution.

16. The electrochemical stripping reactor of claim 15, wherein the anode comprises a titanium mesh coated with iridium-tantalum mixed metal oxide.

17. The electrochemical stripping reactor of claim 15, wherein the cathode comprises a stainless steel mesh.

18. The electrochemical stripping reactor of claim 1, wherein the cation exchange membrane comprises gel polystyrene cross linked with divinylbenzene and modified with sulphonic acid functional group.

19. The electrochemical stripping reactor of claim 1, wherein the gas permeable membrane comprises a hydrophobic material allowing passage of gaseous species and resistant to wetting by water.

20. The electrochemical stripping reactor of claim 19, wherein the gas permeable membrane comprises PTFE or polyethylene.

* * * * *